United States Patent
Guo et al.

(10) Patent No.: US 11,948,453 B2
(45) Date of Patent: Apr. 2, 2024

(54) VEHICLE COMMUNICATION SENDER IDENTIFICATION VIA HYPER-GRAPH MATCHING

(71) Applicant: TOYOTA MOTOR ENGINEERING & MANUFACTURING NORTH AMERICA, INC., Plano, TX (US)

(72) Inventors: Rui Guo, San Jose, CA (US); Sergei Avedisov, Plano, TX (US); Kyungtae Han, Plano, TX (US); Hongsheng Lu, Plano, TX (US); Prashant Tiwari, Plano, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 372 days.

(21) Appl. No.: 17/478,851

(22) Filed: Sep. 17, 2021

(65) Prior Publication Data
US 2023/0093546 A1 Mar. 23, 2023

(51) Int. Cl.
*G08G 1/01* (2006.01)
*H04W 4/46* (2018.01)

(52) U.S. Cl.
CPC .......... *G08G 1/0125* (2013.01); *G08G 1/0112* (2013.01); *H04W 4/46* (2018.02)

(58) Field of Classification Search
CPC ...... G08G 1/0125; G08G 1/0112; G08G 1/01; H04W 4/46
See application file for complete search history.

(56) References Cited

U.S. PATENT DOCUMENTS

| 6,985,089 B2 | 1/2006 | Liu |
| 10,901,417 B2 * | 1/2021 | Noda ................ B60W 60/00 |

(Continued)

FOREIGN PATENT DOCUMENTS

| CN | 109982341 A | 7/2019 |
| JP | 4808127 B2 | 11/2011 |

OTHER PUBLICATIONS

Gao P, Zhang Z, Guo R, Lu H, Zhang H., "Correspondence identification in collaborative robot perception through maximin hypergraph matching," May 31, 2020 (pp. 3488-3494), 2020 IEEE International Conference on Robotics and Automation (ICRA).

(Continued)

*Primary Examiner* — Tan Q Nguyen
(74) *Attorney, Agent, or Firm* — SHEPPARD, MULLIN, RICHTER & HAMPTON LLP; Hector A. Agdeppa; Daniel N. Yannuzzi

(57) ABSTRACT

Connected vehicles and methods described herein provide for message sender identification. Connected vehicles and methods disclosed herein can include generating a message based hyper-graph based on the positions of connected elements of a road traffic network as communicated to the connected vehicle by the connected elements. Connected vehicles and methods disclosed herein can include generating, a perception based hyper-graph based on the perceived positions of at least a subset of the elements of the road traffic network as determined by a sensor of the vehicle. Connected vehicles and methods disclosed herein can include matching a node of the message-based hyper-graph to a corresponding node of the perception-based hyper-graph to determine the sender of a received message.

20 Claims, 6 Drawing Sheets

(56) References Cited

U.S. PATENT DOCUMENTS

| | | |
|---|---|---|
| 10,977,939 B2 | 4/2021 | Zhang |
| 2020/0073382 A1* | 3/2020 | Noda .................. G05D 1/0088 |
| 2020/0307580 A1 | 10/2020 | Kobayashi |
| 2021/0176774 A1 | 6/2021 | Feng |

OTHER PUBLICATIONS

Peng Gao, Rui Guo, Hongsheng Lu, Hao Zhang, "Regularized Graph Matching for Correspondence Identification under Uncertainty in Collaborative Perception," Robotics: Science and Systems (RSS'20) Jul. 12-16, 2020, 10 pages.

* cited by examiner

VEHICLE COMMUNICATION SENDER IDENTIFICATION VIA HYPER-GRAPH MATCHING

TECHNICAL FIELD

The present disclosure relates generally to connected vehicles, and more particularly to systems and methods for determining the sender(s) of a message (or messages), which is useful in cooperative driving.

BACKGROUND OF THE INVENTION

Cooperative driving aims to improve the safety and flow of traffic and/or facilitate road operations by supporting the movement of multiple vehicles in proximity to one another. Cooperative driving is accomplished, for example, by the exchange of information that can be used to influence (directly or indirectly) the performance of driving dynamic tasks, such as to facilitate coordinated lane merging or navigation of a roundabout, by one or more nearby road users. Cooperation among vehicles in traffic can improve safety, responsiveness, mobility, and situational awareness. Vehicles engaged in cooperative driving may share information, such as state (e.g., vehicle position, velocity), intent (e.g., planned vehicle trajectory), and/or seek agreement on a plan (e.g., for coordinated merging). Vehicle-to-everything (V2X), vehicle-to-vehicle (V2V), and other communication standards have developed for communication of information. V2V and V2X is typically implemented by a broadcast mechanism, and one example communication message is the Basic Safety Message (BSM).

Identification of a sender (or senders) of a message (e.g. a BSM) can be important for navigation through a traffic road network and the performance of one or more driving dynamic tasks, including cooperative driving specific tasks such as platoon formation or leader following. The sender(s) of the message is/are not usually identifiable directly from the message, because for privacy reasons, unique identifying information is not included in the message. Furthermore, the reported identifying information, even if included, may not always be trusted. Moreover, the identity of the sender is not easily identifiable via location information from within the message, because location based sensors (e.g. GPS) from which location information in the message is based on, can contain an error at a scale of more than a lane width. As such, it can be difficult to identify the sender(s) of the information, especially in complex (i.e. high traffic) driving situations where the information would be most useful.

BRIEF SUMMARY OF THE DISCLOSURE

As previously alluded to, communication between vehicles may be important for the performance of driving dynamic tasks and for coordinated driving in a traffic road network. However, it may also be important to identify the sender(s) of received messages, especially by a method and system that is robust to sensor (e.g. GPS, ranging) error, and that maintains privacy.

The present disclosure is directed to systems and methods that utilize hyper-graph matching to determine the identity of a sender (and senders) of a received message (and messages) in a traffic road network (e.g. in the same lane or in a different lane) in order to realize cooperative driving. The present disclosure describes systems and methods that allow for recognizing the sender ahead of an ego-vehicle regardless of whether the sender is driving on the same lane as the ego-vehicle in a traffic road network. The present disclosure can allow for identifying the sender(s) of a received message (or messages) without compromising sender privacy, with high reliability and accuracy. The present disclosure utilizes hyper-graph (i.e. a graph having one or more edges joining one or more vertices or nodes, where each node can include one or more corresponding information) matching to determine the identity of a sender (or one or more senders) of a received message (or one or more received messages) in a traffic road network.

The present system includes connected vehicles driving in a traffic road network. The traffic flow could be a mix of connected vehicles and non-connected vehicles. The connected vehicles are broadcasting messages among the connected system. The message exchanging could be in a direct V2V manner. An ego-vehicle, after receiving the messages from surrounding vehicles, can trigger a sender identification process, which tries to identify who the sender(s) of one or more of the received messages is/are.

The sender identification process involves hyper-graph matching, in which a V2V message formulated hyper-graph is matched with an ego-vehicle's proactive sensed hyper-graph (e.g. a hyper-graphs created based on observations). The hyper-graph can comprehensively represent multiple traffic participants in a traffic road network, in a globally structured format and can allow for identification of the multiple traffic participants. The matching can be performed by solving one or more graph matching problem, that integrates at least one of i) the similarities of the attributes of the elements of (i.e., vehicles in) a road traffic network, or ii) the spatial relationships of the elements, into a unified optimization framework.

In example embodiments of the disclosed technology, a vehicle system is disclosed that includes a vehicle control circuit. The vehicle control circuit can includes at least one memory storing machine-executable instructions and at least one processing component configured to access the at least one memory and execute the machine-executable instructions to perform a set of instructions. The machine-executable instructions can allow for message sender identification of a connected element of a road traffic network. The machine-executable instructions, when executed by the processing component, can allow for execution of a method.

The method can include receiving, at a processing component of a vehicle, from one or more connected elements of a road traffic network, one or more messages. The one or more messages can include position information for the one or more connected elements. The method can include generating, by the processing component, a message-based hyper-graph based on the one or more received messages.

The method can include determining, by a sensor of the vehicle, perceived position information for one or more elements of the road traffic network.

The method can include generating, by the processing component, a perception-based hyper-graph based on the perceived position information. The method can include comparing, the message-based hyper-graph to the perception-based hyper-graph. The method can include determining the sender(s) of one or more of the received messages based on the comparison.

In some example embodiments, the method can include determining, by the sensor of the vehicle, perceived attribute information. The one or more messages can include attribute information for the one or more connected elements. In some embodiments, the message-based hyper-graph can be further based on the attribute information in the one or more messages. In some embodiments, the perception-based hyper-graph can be based on the perceived position information and the perceived attribute information.

In some embodiments, the attribute information can include at least one of an element color, element velocity, element acceleration, or an element size.

In some example embodiments, the message-based hyper-graph can include a plurality of nodes. The plurality of nodes can include an ego-vehicle node corresponding to the ego-vehicle. The plurality of nodes can include one or more sender node(s) corresponding to the sender(s) of the message(s). Each node in the plurality of nodes can include corresponding attributes. The message-based hyper-graph can include edges between the nodes corresponding to the distances between the respective elements of corresponding nodes.

According to one or more aspects of the method, the sender(s) of the received message(s) can be determined based on linking a node (or nodes) of the message-based hyper-graph corresponding to the received message(s) for which the sender(s) is/are determined, to a similar node (or respective nodes) of the perception-based hyper-graph.

According to aspects of the present disclosure, the message-based hyper-graph can include a plurality of nodes. The plurality of nodes can include an ego-vehicle node corresponding to the ego-vehicle and. The plurality of nodes can include a sender node corresponding to the sender of the message. The plurality of nodes can include multiple respective sender nodes corresponding to the senders of respective messages. Each node in the plurality of nodes can include corresponding attributes.

The message-based hyper-graph can further include edges between the nodes corresponding to the distances between the respective elements of corresponding nodes.

In example methods, the sender(s) of one or more of the received messages can be determined based on a similarity of the attributes of the message-based hyper-graph compared to the attributes of the perception-based hyper-graph. In example embodiments, the similarity of the attributes can be weighted based on a classification for the attributes. In some embodiments, weights for the similarity of the attributes can be updated based on an outcome of the determination of the sender(s) of one or more of the received messages. In some example embodiments, the sender(s) of one (or more) of the received message(s) can be determined based on the similarity of the attributes of the message-based hyper-graph compared to attributes of the perception-based hyper-graph. In some example embodiments, the sender(s) of one (or more) of the received message(s) can be determined based on the similarity of the positions of the nodes of the message-based hyper-graph compared to positions of the nodes of the perception-based hyper-graph.

In example embodiments, the similarity of the attributes can be weighted based on a classification of an attribute and an uncertainty in the positions for the nodes in the perception-based hyper-graph.

In example embodiments, the sender(s) of (respective) received messages can be determined based on the similarity of the attributes of the message-based hyper-graph compared to attributes of the perception-based hyper-graph. In example embodiments, the sender(s) of one or more of the received messages can be determined based on the angular similarity between two triangles drawn between nodes in each hyper-graph, wherein each triangle is constructed by three nodes of each hyper-graph.

In example embodiments, the message-based hyper-graph can include a plurality of nodes including a node corresponding to the ego-vehicle and a node corresponding to the sender of the message, and edges between the nodes corresponding to the distances between the nodes; and wherein the sender of one of the received messages is determined based on linking a node of the message-based hyper-graph corresponding to the received message for which the sender is determined, to a positionally similar node of the perception-based hyper-graph.

In example embodiments of the disclosed technology, a connected vehicle is disclosed that includes a communication circuit, a perception system, and a processing component. The connect vehicle can perform message sender identification in a road traffic network.

The communication circuit can be configured to receive, from one or more connected elements of a road traffic network, one or more messages. The one or more messages can include position information for the one or more connected elements.

The perception system can include a sensor. The perception system can be configured to determine position information for one or more elements of the road traffic network based on a value of a signal generated by the sensor.

In example embodiments, the processing component can be configured to access at least one memory and execute one or more machine-executable instructions to perform a set of operations, which can include hyper-graph generation and comparison operations. In example embodiments, the processing component configured to generate, for example in a memory, a message-based hyper-graph based on the one or more received messages. The processing component can be configured to generate a perception-based hyper-graph based on the perceived position information. The processing component can be configured to compare the message-based hyper-graph to the perception-based hyper-graph. The processing component can be configured to determine the sender(s) of respective received messages based on the comparison. The processing component can be configured to generate a control input actuation signal based on the determination. The control input actuation signal can be a control input to a vehicle control system and can allow for actuation of the vehicle according to the control input actuation signal.

In example embodiments, the perception system can be configured to generate perceived attribute information for the one or more elements of the road traffic network. The perceived attribute information can be based on the value for the signal generated by the sensor or a value for a signal generated by another sensor. In some examples, the sensor can be a radar sensor, and the another sensor can be an imaging sensor.

In some embodiments, the communication circuit can be further configured to receive attribute information for the one or more connected elements. The attribute information can be embedded in the one or more messages. In some embodiments, the message-based hyper-graph can be generated based on the attribute information in the one or more messages. In some the perception-based hyper-graph can be generated based on the perceived position information and the perceived attribute information. In some example embodiments, the attribute information can include at least one of an element color, element velocity, element acceleration, or an element size.

In some example embodiments, the message-based hyper-graph can include a plurality of nodes. The plurality of nodes can include an ego-vehicle node corresponding to the ego-vehicles. The plurality of nodes can include a sender node corresponding to the sender of the message(s). The plurality of nodes can include sender nodes corresponding to the senders of respective messages. Each node in the plurality of nodes can include corresponding attributes. In example embodiments, the edges between the nodes can correspond to the distances between the respective elements of corresponding nodes.

In example embodiments, the sender(s) of one or more of the received messages can be determined by solving a hyper-graph matching problem that integrates at least one of i) the similarities of the attributes of the elements of the road traffic network, or ii) the spatial relationships between the elements of the message-based hyper-graph and the perception-based hyper-graph.

In some example embodiments, the sender(s) of one or more of the received messages can be determined based on the similarity of the attributes of the message-based hyper-graph compared to attributes of the nodes of the perception-based hyper-graph. In some example embodiments, the sender(s) of one or more of the received messages can be determined based on the angular similarity between two triangles between nodes in each hyper-graph. Each triangle can be constructed by three nodes in each hyper-graph.

In example embodiments, the message-based hyper-graph can include a plurality of nodes that include an ego-vehicle node corresponding to the ego-vehicle, and sender node(s) corresponding to the sender(s) of the message(s). Each node in the plurality of nodes can include corresponding attributes. Edges between the nodes can correspond to the distances between the respective elements of corresponding nodes. In some example embodiments, the sender of one of the received messages can be determined based on a similarity of the attributes of the message-based hyper-graph compared to the attributes of the perception-based hyper-graph.

In some example embodiments of connected vehicles, the similarity of the attributes can be weighted based on a classification for the attributes and an uncertainty in the positions for the nodes in the perception-based hyper-graph.

According to some embodiments, machine-executable instructions, when executed by a processing component of a connected vehicle, can allow for execution of a method for message sender identification of a connected element of a road traffic network. The method can include one or more operations. The operations can include receiving, at a processing component of a vehicle, from one or more connected elements of the road traffic network, one or more messages. The one or more messages can include position information for the one or more connected elements.

The operations can include generating, by a processing component of a connected vehicle, a message-based hyper-graph (message-based hyper-graph) based on the positions of connected elements of the road traffic network as communicated to the vehicle by the connected elements. The nodes of the message-based hyper-graph can correspond to the connected elements of the road traffic network.

The operations can include generating, by the processing component, a perception-based hyper-graph. The perception-based hyper-graph can be based on the perceived positions of at least a subset of the elements of the road traffic network as determined by a sensor of the vehicle. Nodes of the perception-based hyper-graph can correspond to at least a subset of the elements of the road traffic network. The operations can include matching a node of the message-based hyper-graph to a corresponding node of the perception-based hyper-graph.

In some example embodiments, the message-based hyper-graph can be further generated based on a value of communicated attribute information. The communicated attribute information can include at least one of a velocity, brake-pedal status, or dimension of the connected elements as communicated to the vehicle by the connected elements. The perception-based hyper-graph can be further generated based on at least one of a perceived attribute information that includes at least one of a speed, brake-pedal status, or dimension for the at least a subset of the elements of the road traffic network. The matched node of the perception-based hyper-graph can correspond to a node having a similar position and value of perceived attribute information compared to the position and value for the communicated attribute information of the matched node of the message-based hyper-graph.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

As alluded to above, it may be important to identify the sender(s) of V2V or V2X messages. The present disclosure allows for identification of multiple traffic participants in a traffic road network, and the identification of the sender(s) of message(s) in a connected system of a traffic road network. Although examples are provided herein for the identification of a sender of message(s), it can be understood that multiple senders of messages can be identified by the methods and systems disclosed herein. A hyper-graph is a graphical or mathematical representation of objects. A hyper-graph includes an edge that joins any number of nodes or vertices. Hyper-graphs can be used to represent positions of elements of the road traffic network, where the relative positions are represented by the edges, and the nodes represent the elements of the road traffic network. The hyper-graph can further represent the elements' various attributes. Attributes correspond to characteristics of the vehicle. As such, the elements of a road traffic network can be represented as nodes of the hyper-graph. Various hyper-graphs can be generated for the relative positions of the elements of the road traffic network, as determined by various perspectives. A comparison of the various hyper-graphs can allow for the various identifications described herein.

A first hyper-graph (message-based hyper-graph) can be generated for the positions of elements of the traffic road network as based on data communicated by connected elements. A second hyper-graph (perception-based hyper-graph) can be generated for the positions of elements of the road traffic network as determined by a perception circuit of the vehicle. Matching of the two generated hyper-graphs can be utilized for the identification. The system and methods described herein can utilize hyper-graph matching for identification of connected vehicles, non-connected vehicles, and the sender(s) of specific V2V or V2X messages. Although V2V may be described herein, it can be understood that the methods and systems described herein can relate to V2V, V2X, V2I (vehicle-to-infrastructure), V2N (vehicle-to-network), V2P (vehicle-2-pedestrian), or other messaging methods, mechanisms, or applications.

Vehicle Systems

Figure 1:
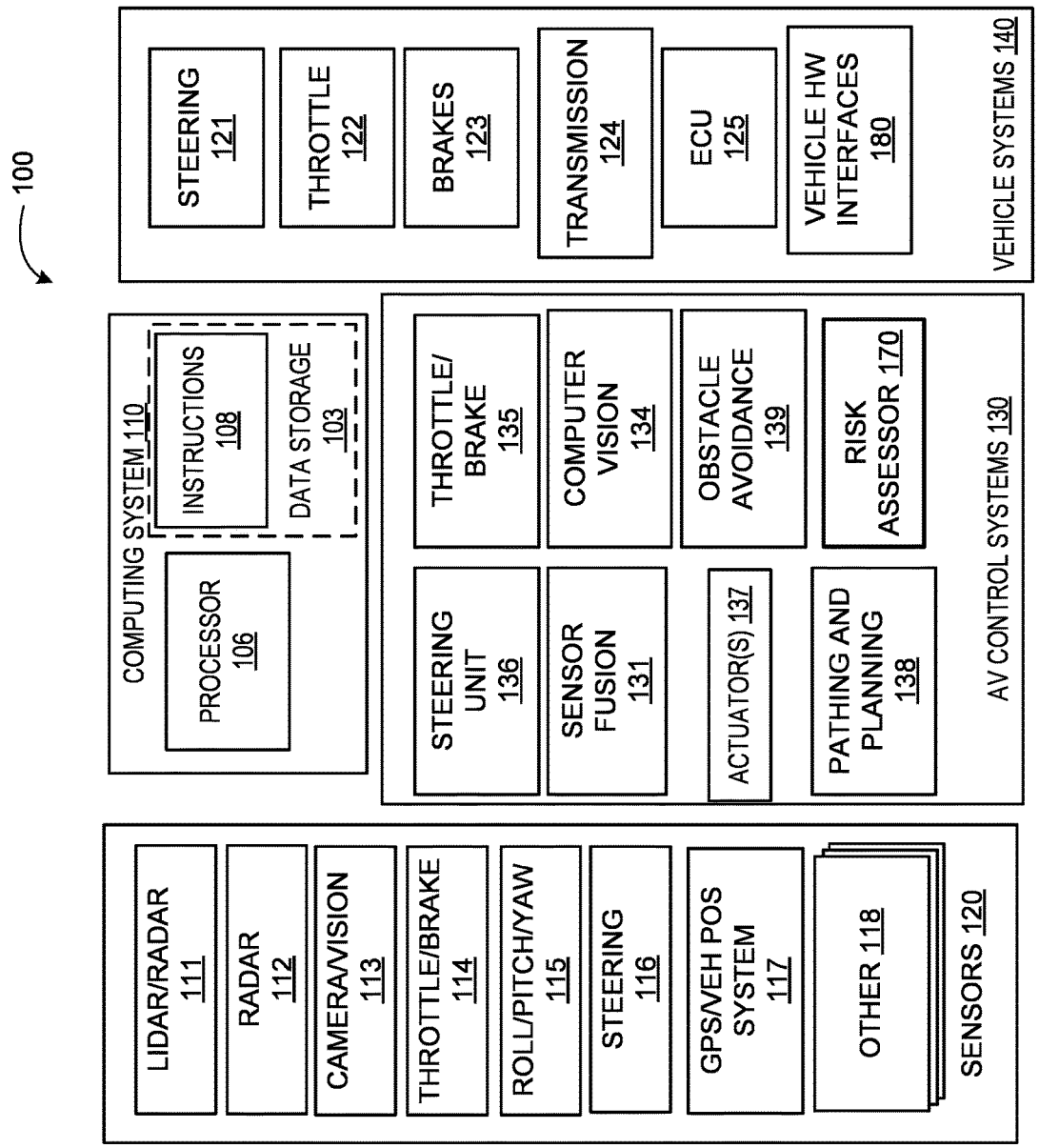
FIG. 1 illustrates an example connected vehicle, and/or autonomous or semi-autonomous vehicle with which embodiments of the disclosed technology may be implemented.

FIG. 1 illustrates an example connected vehicle, and/or autonomous or semi-autonomous vehicle with which embodiments of the disclosed technology may be implemented. As described herein, vehicle 100 can refer to a vehicle, whereby the vehicle 100 and the vehicle 100 components In this example, vehicle 100 includes a computing system 110, sensors 120, AV control systems 130 and vehicle systems 140. Either of the computing system 110, sensors 120, AV control systems 130, and/or vehicle systems 130 can be part of an automated vehicle system/advanced driver assistance system (ADAS). ADAS can provide navigation control signals (e.g. control signals to actuate the vehicle and/or operate one or more vehicle systems 140 as shown in FIG. 1) for the vehicle to navigate a variety of situations. As used herein, ADAS can be an autonomous vehicle control system adapted for any level of vehicle control and/or driving autonomy. For example, the ADAS can be adapted for level 1, level 2, level 3, level 4, and/or level 5 autonomy according to the SAE automated driving classification. ADAS can allow for control mode blending (i.e. blending of autonomous and/or assisted control modes with human driver control). ADAS can correspond to a real-time machine perception system for vehicle actuation in a multi-vehicle environment. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include light detection and ranging (LiDAR) sensor 111, radar 112, or other like the distance measurement sensors, image sensors 113, throttle and brake sensors 114, 3D accelerometers 115, steering sensors 116, and a GPS or other vehicle positioning system 117. One or more of the sensors 120 may gather data and send that data to the vehicle ECU or other processing unit. Sensors 120 (and other vehicle components) may be duplicated for redundancy.

Distance measuring sensors such as LiDAR sensor 111, radar 112, IR sensors and other like sensors can be used to gather data to measure distances and closing rates to various external objects such as other vehicles, traffic signs, pedestrians, light poles and other objects. Image sensors 111 can include one or more cameras or other image sensors to capture images of the environment around the vehicle as well as internal to the vehicle. Information from image sensors 113 (e.g. camera) can be used to determine information about the environment surrounding the vehicle 100 including, for example, information regarding other objects surrounding vehicle 100. For example, image sensors 113 may be able to recognize specific vehicles (e.g. color, vehicle type), landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data, or information from positioning system 117 to determine, refine, or verify vehicle (ego-vehicle or another vehicle) location as well as model the road traffic vehicle network and create ego-vehicle local perception-based hyper-graphs as described herein.

Throttle and brake sensors 114 can be used to gather data regarding throttle and brake application by a human or autonomous operator. Accelerometers 115 may include a 3D accelerometer to measure roll, pitch and yaw of the vehicle. Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle by a human or autonomous operator. A steering sensor may include a position encoder monitor the angle of the steering input in degrees. Analog sensors may collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation and generally unusual at highway speeds. If the driver is turning the wheel at a fast rate while driving at highway speeds the vehicle computing system may interpret that as an indication that the vehicle is out of control. Steering sensor 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

Other sensors 118 may be provided as well. Other sensors 118 can include vehicle acceleration sensors, vehicle speed sensors, wheelspin sensors (e.g. one for each wheel), a tire pressure monitoring sensor (e.g. one for each tire), vehicle clearance sensors, left-right and front-rear slip ratio sensors, and/or environmental sensors (e.g. to detect weather, traction conditions, or other environmental conditions. Other sensors 118 can be further included for a given implementation of ADAS. Other sensors 118 can include sensors within a cabin of the vehicle, such as sensors that detect one or more passengers in a cabin of the vehicle. Various sensors 120, such as other sensors 118 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 can include, autonomous driving module (not shown), steering unit 136, throttle and brake control unit 135, sensor fusion module 131, computer vision module 134, pathing and/or planning module 138, obstacle avoidance module 139, risk assessment module 170 and actuator(s) 137. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g., disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on. Computer vision module 134 may be able to model the road traffic vehicle network, and assist in creating the ego-vehicle local perception-based hyper-graph as described herein. Computer vision module 134 may be able to perform depth estimation, image/video segmentation, camera localization, and object classification according to various classification techniques (including by applied neural networks).

Pathing and/or planning module 138 may be included to compute a desired path for vehicle 100 based on input from various other sensors and systems. For example, pathing and planning module 138 can use information from positioning system 117, sensor fusion module 131, computer vision module 134, obstacle avoidance module 139 (described below) and other systems (e.g. AV control systems 130, sensors 120, and/or vehicle systems 140) to determine a safe path to navigate the vehicle along a segment of a desired route. Pathing module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing and planning module 138 to determine an appropriate path to avoid a detected obstacle.

Pathing and planning module 138 (either alone or in conjunction with one or more other module of AV Control system 130, such as obstacle avoidance module 139, computer vision module 134, and/or sensor fusion module 131) may also be configured to perform and/or coordinate one or more vehicle maneuver. Example vehicle maneuvers can include at least one of a path tracking, stabilization, or collision avoidance maneuver. In connected vehicles, such vehicle maneuvers can be performed at least partially cooperatively.

Vehicle systems 140 may include a plurality of different systems/subsystems to control operation of vehicle 100. In this example, vehicle systems 130 include steering system 121, throttle system 122, brakes 123, transmission 124, electronic control unit (ECU) 125, propulsion system (not shown), and vehicle hardware interfaces 180. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. When control is assumed, computing system 110 and/or av control system 130 can provide vehicle control systems to vehicle hardware interfaces for controlled systems such as steering angle 121, brakes 123, throttle 122, or other hardware interfaces 180 such as traction force, turn signals, horn, lights, etc. This may also include an assist mode in which the vehicle takes over partial control or activates ADAS controls (e.g. AC control systems 130) to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes. For example, memory 103 can include data that has been communicated to the ego-vehicle (e.g. via V2V communication), mapping data, a model of the current or predicted road traffic vehicle network, vehicle dynamics data, computer vision recognition data, and/or other data which can be useful for the execution of one or more vehicle maneuvers, for example by one or more modules of the av control systems 130.

Although one computing system 130 is illustrated in FIG. 1, in various embodiments multiple computing systems 110 can be included. Additionally, one or more systems and subsystems of vehicle 100 can include its own dedicated or shared computing system 130, or a variant thereof. Accordingly, although computing system 110 is illustrated as a discrete computing system, this is for ease of illustration only, and computing system 110 can be distributed among various vehicle systems or components.

Vehicle 100 may also include a (wireless or wired) communication system (not illustrated) to communicate with other vehicles, infrastructure elements, cloud components and other external entities using any of a number of communication protocols including, for example, V2V, V2I (vehicle-to-infrastructure) and V2X protocols. Such a wireless communication system may allow vehicle 100 to receive information from other objects including, for example, map data, data regarding infrastructure elements, data regarding operation and intention of surrounding vehicles, and so on. A wireless communication system may allow vehicle 100 to receive updates to data that can be used to execute one or more vehicle control modes, and/or vehicle control algorithms as discussed herein. Wireless communication system may also allow vehicle 100 to transmit information to other objects and receive information from other objects. In some embodiments, one or more communication protocol or dictionaries can be used, such as the SAE J2735 V2X Communications Message Set Dictionary. In some embodiments, the communication system may be useful in creating a messaging based hyper-graph as disclosed herein.

Communication system can be configured to receive data and other information from sensors 120 that is used in determining whether and to what extent control mode blending should be activated. Additionally, communication system can be used to send an activation signal or other activation information to various vehicle systems 140 and/or AV control systems 130 as part of controlling the vehicle. For example, communication system can be used to send signals to one or more of the vehicle actuators 137 to control parameters, for example, maximum steering angle, throttle response, vehicle braking, torque vectoring, and so on.

In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

Path and/or planning module 138 can allow for executing one or more vehicle control mode(s), and/or vehicle control algorithms in accordance with various implementations of the systems and methods disclosed herein.

In operation, path and/or planning module 138 (e.g. by a driver intent estimation module, not shown) can receive information regarding human control input used to operate the vehicle. As described above, information from sensors 120, actuators 137 and other systems can be used to determine the type and level of human control input. Path and/or planning module 138 can use this information to predict driver action. Path and/or planning module 138 can use this information to generate a predicted modeled road traffic vehicle network and create a predicted ego-vehicle local perception-based hyper-graphs (e.g. for an estimated future timestep). As also described above, information from sensors other systems can be used to determine the state of the driver. Eye state tracking, for example, can be used to estimate driver state. This information can be provided to a risk assessment module 170 to determine the level of risk associated with vehicle operation. Although not illustrated in FIG. 1, where the assessed risk is above a determined threshold, a warning signal can be provided to a driver interface to alert the driver (e.g., audibly or visually) of the risk.

Path and/or planning module 138 can receive state information such as, for example from visibility maps, traffic and/or weather information, hazard maps, and local map views. Information from a navigation system can also provide a mission plan including maps and routing to path and/or planning module 138.

The path and/or planning module 138 (e.g. by a driver intent estimation module, not shown) can receive this information and predict behavior characteristics within a future time horizon. This information can be used by path and/or planning module 138 for executing one or more planning decisions. Planning decisions can be based on one or more policies, such as a defensive driving policy and/or a cooperative driving policy (e.g., swarm or platoon formation, leader following, etc.). Planning decisions can be based on one or more levels of autonomy or connected vehicle actions. Path and/or planning module 138 can generate an expected model for the road traffic vehicle network and create a predicted ego-vehicle local perception-based hyper-graph.

Path and/or planning module 138 can receive risk information from risk assessment module 170. Path and/or planning module 138 can receive vehicle capability and/or capacity information from one or more vehicle systems 140. Vehicle capability can be assessed, for example, by receiving information from vehicle hardware interfaces 180 to determine vehicle capabilities and identify a reachable set model. Path and/or planning module 138 can receive surrounding environment information (e.g. from computer vision module 134, and/or obstacle avoidance module 139). Path and/or planning module 138 can apply risk information and/or vehicle capability and/or capacity information to trajectory information (e.g. based on a planned trajectory and/or driver intent) to determine a safe or optimized trajectory for the vehicle given the drivers intent, policies (e.g. safety or vehicle cooperation policies), communicated information, and given one or more obstacles in the surrounding environment. This trajectory information can be provided to a controller (e.g. ECU 125) or component of AV control system 130 to provide partial or full vehicle control in the event of a risk level above threshold. A signal from risk assessment module 170 can be used to trigger ECU 125 to take over partial or full control of the vehicle.

Figure 2:
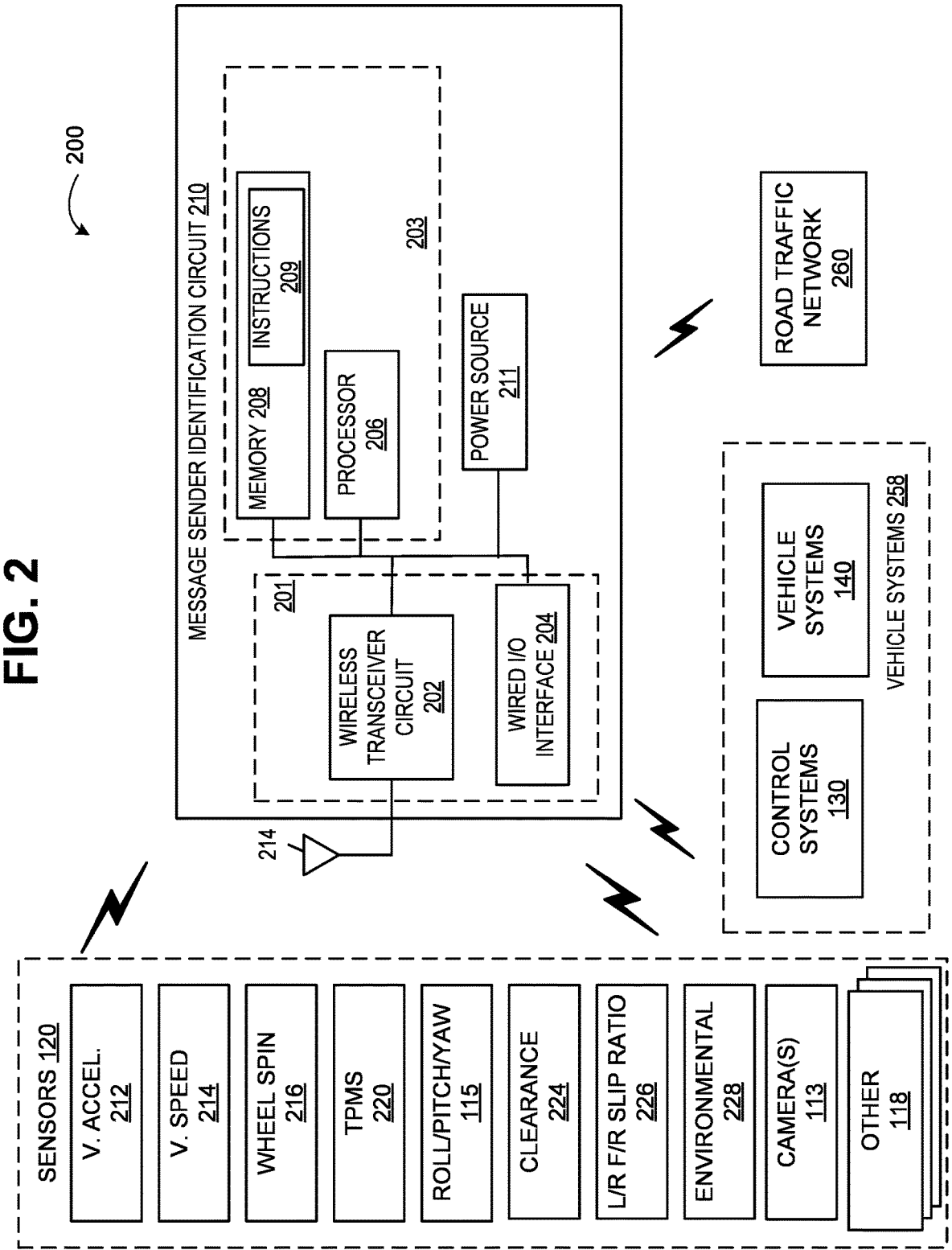
FIG. 2 illustrates an example architecture for generating and matching one or more hyper-graphs and identifying the sender(s) of one or more received messages in a road traffic network, according to embodiments of the present disclosure.

FIG. 2 illustrates an example architecture for generating and matching one or more hyper-graphs as disclosed herein, and identifying the sender(s) of one or more received messages as disclosed herein. Referring now to FIG. 2, in this example, a hyper-graph generation and matching system 200 includes a message sender identification circuit 210, a plurality of sensors 120, and a plurality of vehicle systems 258. Also included are various road traffic network elements 260 with which the Hyper-graph generation and matching system 200 can communicate. Hyper-graph generation and matching system 200 can be implemented as and/or include one or more components of the vehicle 100 shown in FIG.

1. Hyper-graph generation and matching system 200 can be implemented as and/or include one or more components of a user device (such as a mobile phone, laptop, smart watch, personal mobility device, or other personal connected device). Sensors 120, vehicle systems 258, and road traffic network elements 260, can communicate with the message sender identification circuit 210 via a wired or wireless communication interface. Elements of road traffic network 260 can correspond to connected or unconnected devices, infrastructure (e.g. traffic signals, sensors, such as traffic cameras, weather sensors), vehicles, pedestrians, obstacles, etc. that are in a broad or immediate vicinity of ego-vehicle or otherwise important to the navigation of the road traffic network (such as remote infrastructure). Although sensors 120, vehicle systems 258, and road traffic network 260, are depicted as communicating with message sender identification circuit 210, they can also communicate with each other, as well as with other vehicle systems 258. Message sender identification circuit 210 can be implemented as an ECU or as part of an ECU such as, for example electronic control unit (ECU) 125. In other embodiments, message sender identification circuit 210 can be implemented independently of the ECU, for example, as another vehicle system 258.

Message sender identification circuit 210 can be configured to create ego-vehicle local perception-based hyper-graphs (for example based on modeled, observed, or communicated modeled road traffic vehicle network), and create message-based hyper-graph(s). Message sender identification circuit 210 in this example includes a communication circuit 201, a decision and control circuit 203 (including a processor 206 and memory 208 in this example), a power source 211 (which can include power supply) and hyper-graph generation and matching circuit 210. It is understood that the disclosed message sender identification circuit 210 can be compatible with and support one or more standard or non-standard messaging protocols.

Components of message sender identification circuit 210 are illustrated as communicating with each other via a data bus, although other communication in interfaces can be included. Decision and control circuit 203 can be configured to control one or more aspects of hyper-graph generation and message sender(s) identification. Decision and control circuit 203 can be configured to execute one or more steps described with reference to FIGS. 4-7.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions 209 that may be used by the processor 206 to execute one or more functions of message sender identification circuit 210. For example, data and other information can include received messages, and/or data related to generating one or more observation based models for the road traffic network and for generating one or more hyper-graphs as disclosed herein. Operational instruction 209 can contain instructions for executing logical circuits, and/or methods as described herein.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a message sender identification circuit 210. Components of decision and control circuit 203 can be distributed among two or more decision and control circuits 203, performed on other circuits described with respect to message sender identification circuit 210, be performed on devices (such as cell phones) performed on a cloud-based platform (e.g. part of infrastructure), performed on distributed elements of the road traffic network 260, such as multiple vehicles, performed on an edge-based platform, and/or performed on a combination of the foregoing.

Communication circuit 201 either or both a wireless transceiver circuit 202 with an associated antenna 214 and a wired I/O interface 204 with an associated hardwired data port (not illustrated). As this example illustrates, communications with message sender identification circuit 210 can include either or both wired and wireless communications circuits 201. Wireless transceiver circuit 202 can include a transmitter and a receiver (not shown), e.g. a broadcast mechanism, to allow wireless communications via any of a number of communication protocols such as, for example, WiFi (e.g. IEEE 802.11 standard), Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by message sender identification circuit 210 to/from other components of the vehicle, such as sensors 120, vehicle systems 258, infrastructure (e.g. servers cloud based systems), and/or other devices or elements of road traffic network 260. These RF signals can include information of almost any sort that is sent or received by vehicle. These RF signals can include BSM messages described herein.

Wired I/O interface 204 can include a transmitter and a receiver (not shown) for hardwired communications with other devices. For example, wired I/O interface 204 can provide a hardwired interface to other components, including sensors 120, vehicle systems 258. Wired I/O interface 204 can communicate with other devices using Ethernet or any of a number of other wired communication protocols whether standardized, proprietary, open, point-to-point, networked or otherwise.

Power source 211 such as one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, another vehicle battery, alternator, etc.), an energy harvester (e.g., solar cells, piezoelectric system, etc.), or it can include any other suitable power supply. It is understood power source 211 can be coupled to a power source of the vehicle, such as a battery and/or alternator. Power source 211 can be used to power the message sender identification circuit 210.

Sensors 120 can include one or more of the previously mentioned sensors 120. It Sensors 120 can include one or more sensors that may or not otherwise be included on a standard vehicle (e.g. vehicle 100) with which the message sender identification circuit 210 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, environmental sensors 228 (e.g., to detect weather, salinity or other environmental conditions), and camera(s) 213 (e.g. front rear, side, top, bottom facing). Additional sensors 118 can also be included as may be appropriate for a given implementation of hyper-graph generation and matching system 200.

Vehicle systems 158 can include any of a number of different vehicle components or subsystems used to control or monitor various aspects of the vehicle and its performance. For example, it can include any or all of the aforementioned vehicle systems 140 and/or control systems 130 shown in FIG. 1. In this example, the vehicle systems 158 include a GPS or other vehicle positioning system 172.

During operation, message sender identification circuit 210 can receive information from various vehicle sensors 152, vehicle systems 158, and/or road traffic network 260 to determine whether a message (or messages) has/have been received for which the sender(s) should be identified. Also, the driver, owner, and/or operator of the vehicle may manually trigger one or more processes described herein for detecting the sender(s) of a message/essages. Communication circuit 201 can be used to transmit and receive information between message sender identification circuit 210, sensors 152, message sender identification circuit 210 and/or vehicle systems 158. Also, sensors 152 and/or message sender identification circuit 210 may communicate with vehicle systems 158 directly or indirectly (e.g., via communication circuit 201 or otherwise). Communication circuit 201 can be used to transmit and receive information between message sender identification circuit 210, one or more other systems of a vehicle 100, but also other elements in a road traffic network, such as vehicles, devices (e.g. mobile phones), systems, networks (such as a communications network and/or central server), and/or infrastructure. For example, via communication circuit 110, a message or messages can be received (e.g., from another element or elements of the road traffic network), and processed to determine the sender(s) of the message as disclosed herein. Receipt of the message(s) can trigger one or more message sender identification processes herein.

In various embodiments, communication circuit 201 can be configured to receive data and other information from sensors 120 and/or vehicle systems 258 that is used in determining whether and how determine the sender(s) of a message in a road traffic network. As one example, when a message is received from a an element of road traffic network 260, communication circuit 201 can be used to send an activation signal and/or activation information to one or more vehicle systems 258 or sensors 120 for the vehicle to provide certain responsive information. For example, it may be useful for vehicle systems 258 or sensors 120 to provide data useful in creating one or more hyper-graphs described herein. Alternatively, message sender identification circuit 210 can be continuously receiving information from vehicle system 258, sensors 120, other vehicles, devices and/or infrastructure (e.g. those that are elements of road traffic network 260). Further, upon receipt of a message (or messages) for which the sender(s) should be determined, communication circuit 201 can send a signal to other components of the vehicle, infrastructure, or other elements of the road traffic network based on the determination of the sender(s). For example, the communication circuit 201 can send a signal to a vehicle system 258 that indicates a control input for performing one or more cooperative maneuvers.

The examples of FIGS. 1 and 2 are provided for illustration purposes only as examples of vehicles and hyper-graph matching system 200 with which embodiments of the disclosed technology may be implemented. One of ordinary skill in the art reading this description will understand how the disclosed embodiments can be implemented with vehicle platforms.

Figure 3:
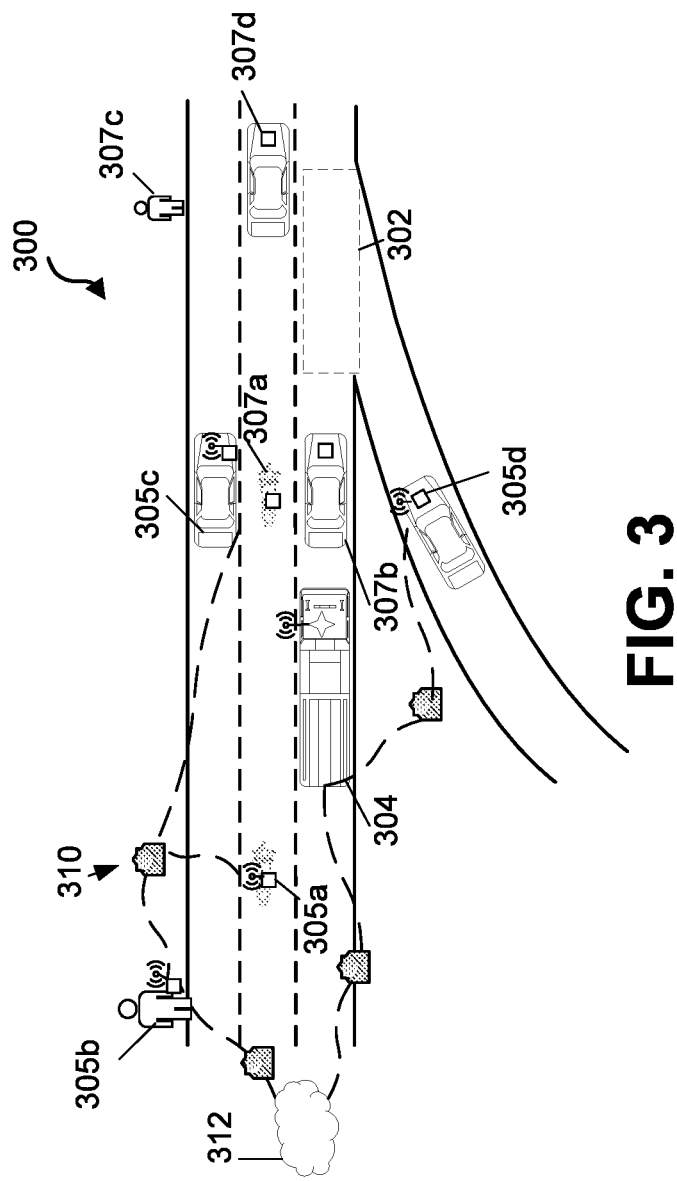
FIG. 3 illustrates an example road traffic network, including an ego-vehicle that can implement aspects of the disclosed technology, in accordance with one or more embodiments herein.

Before getting into specifics implementations, it may be useful to show example road traffic networks and example traffic patterns in which aspects of the present invention may be implemented. FIG. 3 shows an example road traffic network 300. The road traffic network includes multiple physical elements (e.g. pedestrians, animals, vehicles, etc.) navigating a traffic scene. The road traffic network can also include fixed elements within the traffic scene, such as traffic signals, medians, trees, etc. AS such, traffic scene can include one or more elements that are obstacles (e.g. road medians, vehicles, pedestrians) to other navigating elements, and can include one or more traffic patterns, including lane following, lane merging (e.g. at lane merging zone 302), roundabout merging, etc. for navigating elements.

The road traffic network can include one or more vehicles. The vehicles can be or include one or more of the components shown in FIG. 1 and FIG. 2. The road traffic network 300 in general can include one or more vehicles (connected or nonconnected), pedestrians (and/or respective user devices), ground infrastructure, etc. It can be understood that one or more elements of road traffic network 300 can correspond to elements of road traffic network 260 shown in FIG. 2.

It can be understood that driving scenes and road traffic networks can include elements that are mixed connected and unconnected, such as connected or non-connected or convention vehicles. Connected elements of the driving scene may be capable of receiving and/or transmitting messages to other elements of the road traffic network 300, whereas unconnected elements of the road traffic network 300 may not, or may have selectively disabled such a connective A hyper-graph can be created to represent one or more elements of the road traffic network, where the elements are represented as nodes. A hyper-graph for elements of the road traffic network can be depicted as $\mathcal{G}=\{P, A, S\}$. The node set $P=\{p_1, p_2, \ldots p_n\}$ function.

The specific road traffic network 300 illustrated can include an ego element, such as ego-vehicle 304, which can be a connected vehicle (connected vehicles shown with connectivity indicator on the respective vehicle), and in some non-limiting examples, a connected truck. It can be understood that aspects of the present disclosure can be performed at any ego-element (including various vehicles or user devices), and ego-vehicle 304 is merely a non-limiting example. The road traffic network 300 can include one or more other elements. Connected elements of the road traffic network 300 can make up a connected system of various elements. Connected system can include element 305a, which can be a motorcycle and pedestrian 305b, which can be a pedestrian with a connected device (i.e. a mobile phone, laptop, smart watch, or other personal connected device), that facilitates the communication. Other connected elements can include vehicles 305c, and 305d. In some examples, connected elements part of connected systems include various connected infrastructure (such as traffic signals, not shown in FIG. 3), even if those infrastructure are in fixed or relatively fixed positions.

In some examples, the various connected elements can be exchanging one or more messages 310, which can be, for example a BSM. The connected elements can broadcasting messages among a connected system that includes one or more of the connected elements 304, 305a-d. The message exchange could be in the direct V2V manner, or through routes such as P2X, P2V (person-to-vehicle), or indirect routes (e.g. via network 312 or other infrastructure) such as V2I2V, V2N2V/V2X2V etc. In some embodiments, the messages 310 can facilitate driving dynamic tasks in the traffic scene, for example to facilitate coordinated lane merging (e.g. at merging zone 302, or elsewhere), and to facilitate coordinated, assisted, or cooperated maneuvering about the traffic scene.

Other elements of the road traffic network 300 can include nonconnected elements. For example, there can be unconnected motorcycle 307a, unconnected vehicle 307b, unconnected vehicle 307d, and pedestrian 307c. It can be appreciated that one or more elements of the road traffic network can have one or more current and/or planned trajectories or traffic navigation goals, and some of the goals may be interfering (e.g. various elements of the road traffic network 300 can be obstacles to other elements). It can be appreciated that aspects of the present disclosure can allow for navigation of the traffic scene with increased safety while maintaining various goals of elements of the driving scene.

As previously alluded to, it may be desirable for the ego-vehicle to identify the sender(s) of one or more received message(s) 310. This may be beneficial in performing one or more dynamic driving tasks, such as coordinated lane changing, platoon formation, etc. However, as previously noted, the sender information (whether explicit) may not be included in the message 310, it may not be reliably inferred from the message 310, or if included in the message 310, may not be reliable. Further, the road traffic network 300 may include multiple elements, both connected and unconnected, which may be located within a radius of sensor error with respect to location information in the message. Further, connected elements may be visually indistinguishable from nonconnected elements of the driving scene, which may contribute to a false positive or false negative determination of the sender(s) of the message(s) based on visual cues.

The ego-vehicle 304 after receiving one or more messages 310, from surrounding elements of the road traffic network, may trigger the sender identification process, for example at least by hyper-graph generation and matching system 200 (with reference to FIG. 2). Sender identification may include identifying the specific element within the road traffic network 300 that sent the message 310. Sender identification may include identifying the specific elements within the road traffic network 300 that sent respective message(s) 310. For some message 310, the regular velocity and dynamic status of the element that sent the message 310, can be encoded and shared (e.g. through a shared radio channel). It may be important to identify the sender, particularly because identifying information for the road traffic network element 300 may be missing from the message 310, for example, to preserve privacy.

The ego-vehicle 304 can include one or more sensors. Sensors can include a camera, LIDAR or radar, (see also sensors 120 with reference to FIG. 1 and FIG. 2). As such, the ego-vehicle 304 can have proactive sensing to perceive the surrounding traffic scene in the road traffic network 300. In some embodiments, a ranging sensor at the vehicle 304 could measure the distance between the ego-vehicle 304 and its neighboring vehicles (e.g. motorcycle 305a, merging vehicle 305a, unconnected vehicle 307b). However, the ranging sensor (and other sensors) may have certain error margin in its measurement(s), and thus it would be further unreliable to determine the sender(s) of the message(s) 310 based on a location of the ego-vehicle 304 (e.g. by a sensor 102), and based on the ranging sensor information (e.g. by triangulation). Further, sensors 120, such as cameras, of the ego-vehicle 304, could capture one or more identifying information of the surrounding elements of the road traffic network 300 (such as by recognition of a license plate, visual fiducials, or other identifying information on the vehicle). However, even in situations where a visual fiducial or other identifying information of the traffic element may be periodically updated or changed, it is not desirable for the message 310 to include such identifying information so that privacy can be maintained. Similarly, it may also not be desirable for recognizable identifying information (such as color of the physical element of the scene, such as vehicle color, to be provided in the message 310), because various elements within the road traffic network 300 may have the same recognizable identifying information. For example, the sender(s) may not be distinguished between vehicles of the same make, model, and color.

As such, as previously alluded to, it may be desirable for a more reliable, yet private process for determining the sender(s) of message(s) 310 in a vehicle traffic network 300. For an ego-vehicle, two types of hyper-graphs could be established and will be discussed herein.

As previously alluded to, the process for identifying the sender(s) of a message 310 or more than one message in road traffic network 300 can include generating one or more hyper-graphs. One example hyper-graph that can be utilized is a message-based hyper-graph. A message-based hyper-graph can include each of the encoded information in the message(s) 310. The messages, e.g. BSMs, can include, for example, the senders' GPS location, speed, brake-pedal status, and dimension/size information. The information could be encoded and transformed into a hyper-graph, as shown in FIG. 4.

represents the positions of the nodes in the network (the positions of the elements of the road traffic network) where $p_i=\{x, y, z\}$ denotes the 3D position of the i-th element and n is the number of elements or nodes. $A=\{a_1, a_2, \ldots a_n\}$ denotes the set of attributes to encode for the element of the road traffic network. $a_i$ is a vector of attributes of the i-th object located at $p_i$. $S=\{S^d, S^a\}$ denotes the spatial relationships among the nodes or elements of the road traffic network. $S^d=\{s_{i,j}{}^d\}$ denotes the set of distance relationships between a pair of nodes, where $s_{ij}{}^d$, i, j=1, 2, ... n, i≠j denotes the distance between $p_i$ and $p_j$. $S^a=\{s_{i,j,k}{}^a\}$ denotes the set of angular relationships, where $s_{i,j,k}{}^a=[\theta_i, \theta_j, \theta_k]$, i, j, k=1, 2, ... n, i≠j≠k are the angles of the triangle constructed by nodes $p_i$, $p_j p_k$.

The angular relationship may be considered over the distance relationship, because it is invariant to scale variations and more robust to spatial deformations compared to the distance relationship. However, it can also be understood that the distance relationship between pairs of nodes can be used instead.

Figure 4:
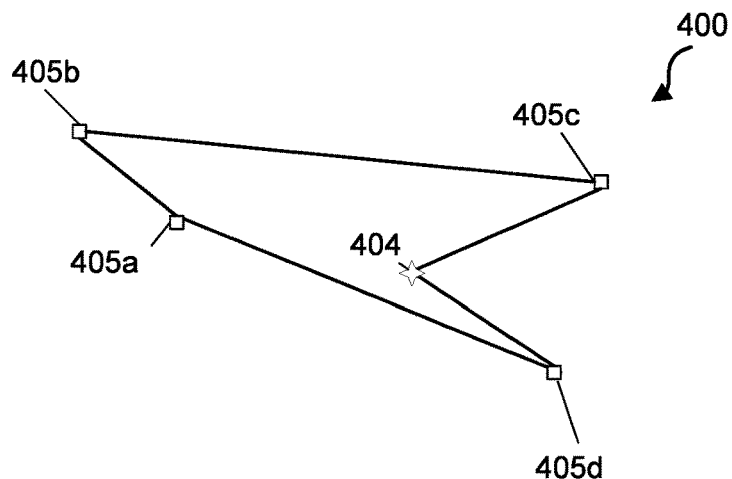
FIG. 4 illustrates an example message based hyper-graph generated from the road traffic network shown in FIG. 3, according to various embodiments described herein.

FIG. 4 shows an example message-based hyper-graph 400 generated from the road traffic network 300 shown in FIG. 3. The message-based hyper-graph 400 can be a representation of the connected system in road traffic network 300. It can be based on BSB or other messaging. The message-based hyper-graph 400 can be based on one or more received messages (see message 310 in FIG. 3, which can be e.g., by P2V, V2V, V2X2V, etc.)

The message-based hyper-graph 400 can be represented as $\mathcal{G}=\{P,A,S\}$, including vectors for the positions P of the nodes as determined based the reported positions in the messaging, vectors for the attributes A of the connected elements as determined based on the messaging, the connected elements represented by the notes, and the relative angular relationships between the nodes or vertices, S. It can also be understood that the hyper-graph 400 can be represented as $\mathcal{G}=\{P,A\}$, i.e., without the vectors for the angular relationships S. It can also be understood that the hyper-graph 400 can be represented as $\mathcal{G}=\{P\}$, or $\mathcal{G}=\{P,S\}$, i.e., without the vectors for the attribute information A (e.g. if attributes are not included in the message).

The message-based hyper-graph 400 can include one or more vertices or nodes (OR and one or more edges (shown by dotted line) between the nodes. Each vertex or node in the graph 400 can represent the location of the connected elements in the road traffic network 400. Each vertex or node can be positioned at a geometric center point of the element, or another uniform point for each object (such as at a portion closest to the ego-vehicle in the graph 400. In some examples, the center point is determined based on reported location and size/dimension information within the message. The location can be self-reported by the elements of the connected system, for example, via the received messages.

Keep in mind that the ego-vehicle may not be able to identify the sender(s) of each message 310 based on the messages (e.g. embedded location or vehicle size information) alone, at least because the location may be inaccurate (or various other reasons previously identified). Having said, that, node 404 can approximately correspond to ego-vehicle 304, nodes 405a, 405b, 405c, 405d, can each correspond to motorcycle 305a, pedestrian 305b, vehicle 305c, and vehicle 305d, respectively Aspects of the present disclosure can allow for the ego-vehicle 304 to determine that correspondence. In some embodiments, the edges between the nodes or vertices can represent distance information between the vertices, calculated (e.g. by triangulation) from the location information reported in the messages (e.g. GPS readings).

It can be understood that edges maybe optimized so that a closed polygon is created between the nodes (if there are three or more nodes). The attribute vector of the vertex can include one or more attributes from the respective message, such as speed, brake-pedal status, dimension of the vehicle and other information (e.g. BSM information) of the vehicle that sent the message 310 (although the specific identify of the vehicle may not be known).

As can be seen by comparing FIG. 3 and FIG. 4, various nonconnected elements of road traffic network 400 are excluded from the message-based hyper-graph 400, such as vehicle 307b and pedestrian 307c.

It can be understood that one or more hyper-graphs can be generated based on the message(s), including at corresponding time steps. For example, if the messaging include (or can be inferred or determined) one or more planned trajectories or planned locations at a future timestep, a message-based hyper-graph can be generated for that future timestep. It can also be understood that messages can be received at different times. As such, one or more hyper-graphs can be supplemented as information is provided.

As previously alluded to the ego-vehicle can also have one or more sensors (e.g. sensors 120 with respect to FIGS. 1 and 2) and can thus have its own perception sensor suite. As previously alluded to, the road traffic vehicle network can be modeled by the ego-vehicle. In some embodiments, various objects within the field of view of various sensors in the perception suite can be detected (e.g. by sensor fusion module 131, computer vision module 134, pathing and/or planning module 138, obstacle avoidance module 139, described with reference to vehicle 100, and hyper-graph matching system 200 described with reference to FIG. 2). Based on the modeled road traffic vehicle network, according to the ego-vehicle's onboard sensor suite, another hyper-graph could be established.

Figure 5:
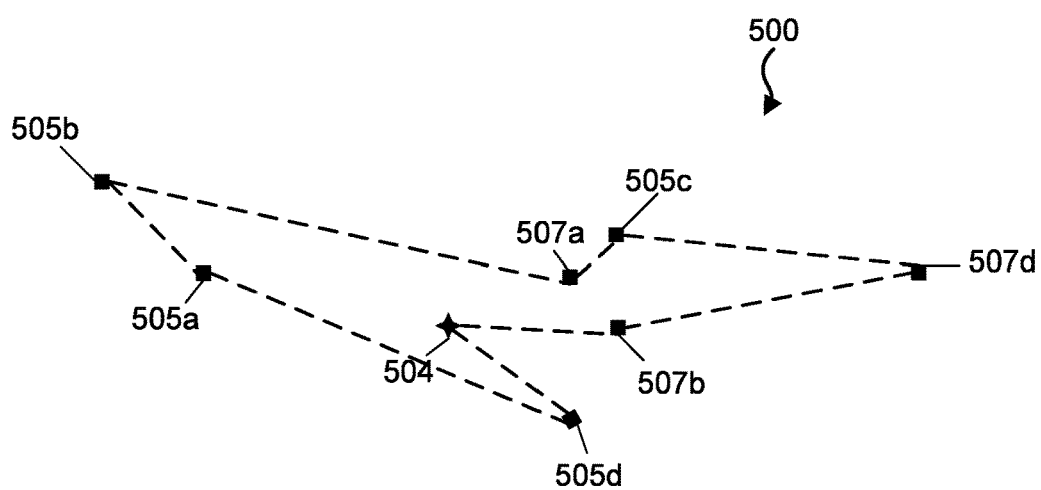
FIG. 5 illustrates an ego-vehicle local perception-based hyper-graph that can be created by ego-vehicle in the road traffic network 300 shown in FIG. 3, in accordance with one or more implementations.

FIG. 5 corresponds to an ego-vehicle local perception-based hyper-graph 500 that can be created by ego-vehicle 304 in the road traffic network 300 shown in FIG. 3.

The ego-vehicle local perception-based hyper-graph 500 (an example of observation based hyper-graph) can include an ego-vehicle node 504 or vertex corresponding to the ego-vehicle. The location coordinates for the ego-vehicle can be determined based on one or more sensors (e.g. sensors 120 shown in FIGS. 1 and 2), mapping (e.g. high definition maps), vehicle systems 258, or combination thereof. The ego-vehicle local perception-based hyper-graph 500 can include nodes corresponding to one or more other observable elements of the road traffic network.

The ego-vehicle local perception-based hyper-graph 500 can be represented as $\mathcal{G}'=\{P',A',S'\}$, including vectors for the positions P', corresponding to the positions (or location coordinates as previously alluded to) of the nodes or vertices of the hyper-graph, or otherwise the positions of the elements of the road traffic network 300 as determined by the ego-vehicle 304. The hyper-graph 500 can include attribute vector(s) A', which can correspond to the attributes of the elements of the road traffic network 300 as determined by the ego-vehicle 304 (e.g. brake light status, vehicle color, vehicle size, characteristics of the pedestrian—if a pedestrian, speed, velocity, depth, etc.). The hyper-graph 500 can include angular relationships vector(s). The relative angular relationships, S', can include the relative angular relationships of the nodes or vertices. It can also be understood that the hyper-graph 500 can be represented as $\mathcal{G}'=\{P',A'\}$, i.e. without the vector for the angular relationships. It can also be understood that the hyper-graph 400 can be represented as $\mathcal{G}'=\{P'\}$, or $\mathcal{G}'=\{P',S'\}$, i.e., without the vectors for the attribute information A' (e.g. if attributes cannot be perceived).

In the ego-vehicle local perception-based hyper-graph 500, each vertex can represent the location of the detected (by the ego-vehicle 304) road traffic network 300 elements. The location coordinates P' of the ego-vehicle can be inferred from onboard ranging sensing. The observable elements' (e.g. other vehicles') location, speed, size, and/or dimension or other attributes A' could be measured using the ego-vehicle's various sensors (e.g. sensors 120) (or by conversion of one sensed signal into location, speed, size, etc.).

As previously noted, each vertex or node can have an attribute vector $A'=\{a'_1, a'_2, \ldots a'_n\}$. The attributes in the attribute vector of the vertex or node, can be the same as attributes the attribute or features vector generated from message hyper-graph 400, (i.e. the attributes defined by $A=\{a_1, a_2, \ldots a_n\}$). One difference can be that the values for the attributes are calculated from and by the ego-vehicle, such as the ego-vehicle's 304 onboard sensor(s) (e.g., sensors 102 with reference to FIG. 1 and FIG. 2).

It can be understood that aspects of the disclosed technology can account for various errors in the measurements, as well as errors in the determined attributes. As one example attribute, the ego-vehicle 304 could also detect if the surrounding elements of the road traffic network 300 have the rear brake lights on, or front or rear blinkers (turning signals). The brake light can correspond to the status of the brake pedal.

In the ego-vehicle local perception-based hyper-graph 500, it can be understood that some of the elements of the road traffic network 300 can be omitted, for example due to occlusion. For example, pedestrian 307c may not be visible by the ego-vehicle 303 in the road traffic network 300. As such, there is no corresponding vertex of the ego-vehicle local perception-based hyper-graph 500 for pedestrian 307c.

Figure 6:
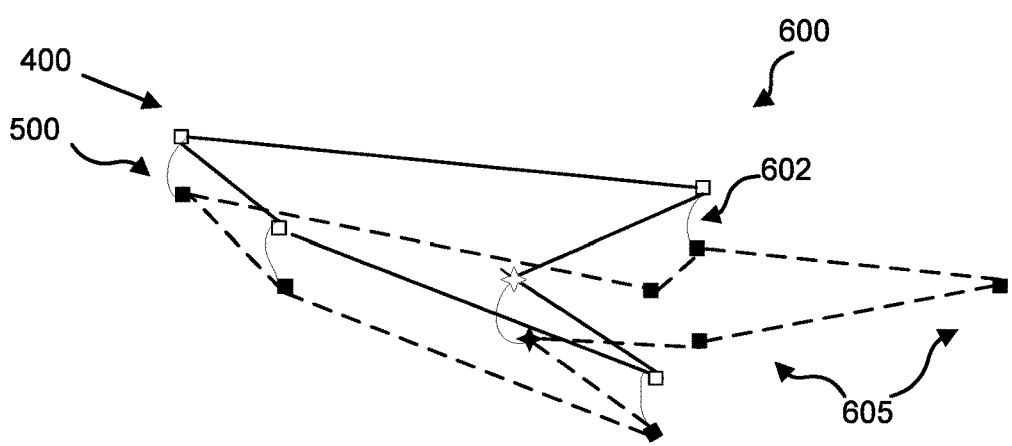
FIG. 6 illustrates a comparison between the message based hyper-graph described with reference to FIG. 4 and the ego-vehicle local perception-based hyper-graph described with reference to FIG. 5, which can be performed in order to identify the sender(s) of the message(s) in a road traffic network according to various implementations herein.

FIG. 6 shows a comparison 600 hyper-graph that compares the message based hyper-graph 400 described with reference to FIG. 4 (shown in FIG. 6 with solid colored nodes and edges therebetween) and the ego-vehicle local perception-based hyper-graph 500 described with reference to FIG. 5 (shown in FIG. 6 with white nodes, an edges therebetween). The similarity can be denoted by one or more links 602 between corresponding nodes. The linked nodes (e.g. by link 602) can correspond to nodes that are spatially similar and/or have similar values for attributes (i.e. compared to other nodes in the other hyper-graph). The comparison can be performed in order to identify the sender(s) of one or more message 310 in the road traffic network 300 shown in FIG. 3.

To identify the sender(s) of one or more message 310, the ego-vehicle 304 (i.e. by way of message sender identification circuit 203 described with reference to FIG. 2) can match the message based hyper-graph 400 and the ego-vehicle local perception-based hyper-graph 500 and determine the correspondence between the two hyper-graphs 400, 500. As such, a hyper-graph matching algorithm can be executed at the message sender identification circuit 203 or ECU 125 of the ego-vehicle 304 to determine the correspondence or similarly. Both the similarity between vertexes (or nodes), as well as the similarity between the edges can be evaluated.

Example methods of determining similarity between hyper-graphs are described in the publication "Correspondence identification in collaborative robot perception through maximum hyper-graph matching" authored by Gao P, Zhang Z, Guo R, Lu H, Zhang H, and published by IEEE in the proceedings of the 2020 IEEE International Conference on Robotics and Automation (ICRA) on 2020 May 31 (pp. 3488-3494), the entirety of the contents of which are incorporated by reference herein.

Given the message based hyper-graph 400 $\mathcal{G}=\{P,A,S\}$, and the ego-vehicle based hyper-graph 500 $\mathcal{G}'=\{P',A',S'\}$, the similarly between the elements of the road traffic network elements (e.g. positions, attributes, etc.) can be observed, to facilitate correspondence of the graphs and identification of the element that sent a specific message.

An attribute similarity matrix A, distance similarity matrix D, angular similarity tensor T, and correspondence matrix X can be generated to compare the similarity between hyper-graphs (i.e. hyper-graphs 400, 500).

The attribute similarly can be computed by:

$$A_{i,i'} = \frac{a_i a'_{i'}}{\|a_i\|\|a'_{i'}\|}.$$

$A_{i,i'}$ denotes the similarity between attribute vectors $a_i \in A$ and $a'_{i'} \in A'$. The attribute similarities of all elements represented by the two hyper-graphs 400, 500, can be denoted as a matrix $A=\{A_{i,i'}\} \in \mathbb{R}^{n \times n'}$. The distance similarity between two pairs of elements (or nodes) can be calculated by:

$$D_{ii',jj'} = \exp\left(-\frac{1}{\gamma}\left(s_{i,j}^d - s_{i',j'}^{d'}\right)^2\right)$$

where $D_{ii',jj'}$ is the similarity between distance $s_{i,j}^d \in S^d$ and distance $s_{i',j'}^{d'} \in S^{d'}$. We use an exponential function parameterized by $\gamma$ to normalize $D_{ii',jj'} \in (0,1]$. The distance similarities of all pairs of elements represented by the two graphs can be denoted by the matrix $D=\{D_{ii',jj'}\} \in \mathbb{R}^{nn' \times nn'}$. The angular similarity between two triangles constructed by three nodes in each graph (i.e. hyper-graph 400, 500) can be defined as follows:

$$T_{ii',jj',kk'} = \exp\left(-\frac{1}{\gamma}\sum_{p \in i,j,k; q \in i',j',k'} \left|\cos(\theta_p) - \cos(\theta'_p)\right|\right).$$

$T_{ii',jj',kk'}$ denotes the similarity between triangle $s_{i,j,k}^a \in S^a$ and triangle $s_{i',j',k'}^{a'} \in S^{a'}$. The angular similarities of all elements of the road traffic network 300 encoded by the two hyper-graphs 400,500 can be denoted by the tensor $T=\{T_{ii',jj',kk'}\} \in \mathbb{R}^{nn' \times nn' \times nn'}$. Then the correspondence identification can be formulated as a graph matching problem that integrates the similarities of the attributes of the elements and spatial relationships into a unified optimization framework to identify correspondence of the elements in the road traffic network. Mathematically, the problem formulation can be expressed as follows:

$$\max_X A^\top x + x^\top Dx + T \otimes_1 x \otimes_2 x \otimes_3 x$$

$$\text{s.t. } X1_{n' \times 1} \leq 1_{n \times 1}, X^\top 1_{n \times 1} \leq 1_{n' \times 1}.$$

In the problem formulation above, $X \in \mathbb{R}^{n \times n'}$ is the correspondence matrix, $X=\{x_{ii'}\} \in \{0,1\}^{nn'}$ is the vectorized form of X, with $x_{ii'}=1$ indicating that the i-th element or node in $\mathcal{G}$ corresponds to the i'-th in $\mathcal{G}'$ (otherwise $x_{ii'}=0$), $\otimes$ denotes tensor product, $\otimes_l$ l=1,2,3 denotes multiplication between x and the mode-l matricization of T, and 1 denotes a vector with all ones.

The objective function in the problem formulation above denotes the overall similarity, given the correspondence matrix X. The first term denotes the accumulated attribute similarity, the second term denotes the accumulated distance similarity, and the third term denotes the accumulated angular similarity of the elements of the road traffic network encoded by the pair of hyper-graphs 400, 500. The constraints in the problem formulation are introduced to enforce each row and column in X to at most have one element equal to 1, thus guaranteeing one-to-one correspondences.

In other words, an objective function can be created based on the problem formulation, that denotes the overall similarity, given the correspondence matrix X. The correspondence between the hyper-graphs can be solved for as a graph matching problem that integrates the similarities of the attributes of the elements of the road traffic network 300 from the two hyper-graphs 400, 500 and spatial relationships between the respective nodes from the two hyper-graphs 400, 500, into a unified optimization framework to identify correspondence of the nodes.

Weight matrices $W^a$, $W^d$, $W^t$, can be created to denote the relative importance of the elements of attribute similarity matrix A, distance similarity matrix D, and angular similarity tensor T. For example, the relative importance of the attributes can be adjusted by the weight matrices for the attributes, $W^a$. As such, dominant or more important attributes or features (e.g., in some implementations, braking) can be given higher weight than less important attributes or features. In some implementations, the weights can be adjusted or can depend on the type of traffic scenario, the number of elements (or specific types of element), or density thereof, in the road traffic pattern, various contents in the message 310 for which the sender(s) is/are to be determined. The weights can also depend on the uncertainty of various models or sensors described herein (to be described in more detail below).

In some embodiments, the weights can be adjusted, or starting values can be determined (e.g. by training), based on one or more machine learning models, as implemented by one or more neural networks, for example. As such, in some embodiments, the relative importance of elements of attribute similarity matrix A, distance similarity matrix D, and angular similarity tensor T can be learned and/or updated based on training, and/or based on outcomes for processes described herein. For example, the result of determining the sender(s) of message(s) 310 (i.e. a successful or unsuccessful determination, as confirmed by one or more confirmation signals), the result of performing one or more cooperative maneuvers or vehicle response actions (e.g. a successful or unsuccessful cooperative lane merging, a successful response to the presence of an obstacle) based on the determination of the sender(s) of the message(s) 310 can be utilized to updated one or more weights described herein. In some example systems the result of performing one or more cooperative maneuvers can be determined by consensus, by the leader or followers of the cooperative maneuver, by time to completion, by smoothness of merging, or by lack or minimization of accidents, or erratic driving behavior. It should be appreciated that the above example vehicle response actions, or performance of vehicle maneuvers are merely illustrative and not exhaustive.

The comparison can be depicted graphically (see comparison 600). Links 602 (proxy for similarity) between corresponding nodes can be marked. Links that correspond to dissimilar or highly dissimilar nodes and/or edges, can have a length highly different than an average. These dissimilar links can be marked (e.g. with a cross) to better show visually the dissimilar links. The dissimilar or marked links can mean that the vertexes from the message based hyper-graph 400 do not match with the vertices of the ego-vehicle local perception-based hyper-graph 500 due to the dissimilarity they contain.

In some embodiments, some nodes or vertices from one hyper-graph may not have corresponding links to a node or vertex in the other hyper-graph. These lone nodes can be marked (e.g. with a cross) to better show visually the dissimilar nodes (marking not shown in FIG. 6). The dissimilar or marked nodes can mean that the vertexes from the message based hyper-graph 400 do not match with the vertices ego-vehicle local perception-based hyper-graph 500 due to the dissimilarity.

As shown in FIG. 6, various nodes in the ego-vehicle local perception-based hyper-graph 500 have no corresponding node of the message based hyper-graph 400 (i.e. no link 602 between nodes). These are shown as lone nodes 605. If the lone-nodes are in the message based hyper-graph 400, the ego-vehicle 304 can determine which connected elements or elements of the connected system are occluded, or otherwise not perceived by the ego-vehicle 304. If the lone-nodes (e.g. lone nodes 605) are in the ego-vehicle local perception-based hyper-graph 500, the ego-vehicle 304 can determine which elements of the road traffic network 300 are non-connected.

Once the matching process is completed, the identity of the sender(s) of one or more message may be determined. It can be understood that the message sender of a message 310 that was used to generate a node of the message based hyper-graph 400, can be the element of the ego-vehicle local perception based hyper-graph 500 that is linked (e.g. by link 602) to that node of the message based hyper-graph 400. This concept also extends to identification of multiple senders via respective linking. The matching process can allow for concurrently determining multiple senders, of multiple respective messages in the road traffic network. The matching process can be performed at message sender identification circuit 210.

If one of the message based hyper-graph 400 nodes do not have a corresponding link 602 and corresponding node of the ego-vehicle perception-based hyper-graph 500, the hyper-graph 400 can be supplemented by cooperative observation. For example, it can be compared to other-element perception-based hyper-graphs (e.g. hyper-graphs created based on the perceived road traffic network 300 from on-board sensors of other elements of the road-traffic network 300, such as cameras and/or ranging sensors at traffic lights, or cameras and/or ranging sensors at vehicles other than ego-vehicle 304). One such example of cooperative observation is collective perception messages (CPMs) in which connected elements of the road traffic network 300 (e.g. connected vehicles in the road traffic network 300) broadcast the objects locally detected by their sensors. It can also be understood that cooperative observation can be utilized to verify the generated hyper-graphs, or otherwise verify the matching processes disclosed herein. Cooperative observation can be utilized to update one or more models, methods, processes disclosed herein (such as various weights disclosed herein).

It can be understood that comparisons for hyper-graph matching can be performed for hyper-graphs corresponding to various time-points, including predicted positions/attributes for the various elements.

It can be understood that the process of the present disclosure can account for elements of the road traffic network which may have been omitted from either of the hyper-graphs. For example, if an element of the road traffic network is omitted from the ego-vehicle local perception-based hyper-graph 500, if it is a connected element, it will be detected and accounted for by the message based hyper-graph 400. If the omitted element from the ego-vehicle local perception-based hyper-graph 500 is nonconnected element, the purpose is to detect the sender(s) of messages, so that omitted element could not have sent the message in the first place. On the contrary, if an element is omitted from the message based hyper-graph 400, it did not send a message, so it would not have been included in the first place. Similarly, systems and methods described herein are robust in view of multiple elements (inadvertently or deliberately) omitted from one or more hyper-graphs. In other words, the scope is to find a possible sender (or senders) of a message (or messages), so it is not of interest if one or more non-sender(s) of a message gets/get omitted from either graph.

It can also be appreciated that the methods and systems disclosed herein are robust enough to account for uncertainty in the various sensors, models, and circuits implemented. For example, as previously alluded to, various errors can be due to sensor resolution limit and noise, measurement scenario variations, and perception model bias. Thus, it can be understood that the process(es) of the present disclosure can account for multiple collocated (i.e. within margin of error) and/or visually similar elements of the road traffic network, and allow for identification of multiple senders of messages in such a context. The process(es) of the present disclosure can also allow for the identification of multiple senders of message(s) in dense as well as mixed road traffic networks.

Neural networks can be used (for example by computer vision module 134, or the ECU 125) to account for the aforementioned uncertainty. Bayesian neural network (BNN) can be used to quantify the uncertainty in machine perception, including in depth estimation, and segmentation, camera localization, and object classification. It can be understood that the same uncertainty principals used for quantifying uncertainty in perception, can be used for non-perception based uncertainty. Uncertainty in machine perception based on BNN can generally divided in two categories: epistemic uncertainty and aleatoric uncertainty. Epistemic uncertainty can be defined as the ambiguity in the BNN learning model e.g., the learning model cannot explain all training data. The epistemic uncertainty can be calculated as the variance of the posterior distribution of BNN model parameters. Aleatoric uncertainty is defined as the ambiguity in training data (e.g. caused by over-exposed regions in images when performing monocular depth estimation). The aleatoric uncertainty can be computed as the variance of the likelihood distribution of training data, which can be obtained by sampling techniques, such as Monte Carlo sampling, or variational inference. The same definitions of perception uncertainties, can be used, and be addressed along with non-visible elements in order to enable correspondence identification in hyper-graphs described herein and identification of the sender(s) of messages described herein.

It can be understood that the problem formulation above, can formulate correspondence identification as an optimization problem which can be regularized in order to explicitly address the challenges of uncertainty and non-covisibility (i.e. elements addressed by one hyper-graph but not another).

As such, the uncertainty in element attributes (of various hyper-graphs described herein) can be defined as the average of the variances of individual elements in the attribute vector. BNNs can be used to estimate the attribute uncertainty. By sampling the posterior distribution of the BNN model parameters, the variance of the model parameters can be computed as the epistemic uncertainty that captures the ambiguity in the BNN model. By sampling the likelihood distribution of the predicted labels for the attributed, the variance of the semantic labels can be calculated as the aleotoric uncertainty that captures the ambiguity in data. Then, the uncertainty of the attributes of the elements can be computed as a sum of the epistemic and aleatoric uncertainties. Weight matrices for the attributes, $W^a$, can be computed for the attribute similarity matrix A, (discussed above) based on the uncertainty of the attribute vectors, e.g. based on the average of the variances of the individual elements in the attributes $a_i$, $a'_i$. As such, the attributes that have lowest or lower uncertainty can be given greater importance, and the relative importance of the attributes can be seen by the weight matrices for the attributes, $W^a$.

Similarly to how weight matrix $W^a$ is created for attribute matrix A and denotes the relative importance based on uncertainties, weight matrices $W^d$ and $W^t$, can be created for the distance similarity matrix D and angular similarity tensor T, and can encode the importance of the similarities in distance similarity matrix D and angular similarity tensor T. Similarly to the attribute weight, $W^d$ can be based on position uncertainty of a pair of elements, and a larger weight can be assigned to lower position uncertainty. Thus, methods and systems described can rely more on the similarities with a lower uncertainty for correspondence identification.

As a specific, non-limiting example, the uncertainty in element positions can be defined as the average of the variances of pixel-level depth values of the various elements. BNNs can be used to estimate the depth values if depth values are not available, and can be used to provide the uncertainty. Similarly, this uncertainty when BNNs are used, is a sum of the epistemic uncertainty in the BNN model and the aleotoric uncertainty in the data.

Further, a regularization term over the correspondence matrix X (described above) can be introduced to control the sum of uncertainties. For example, if two elements have larger uncertainties it may still be inappropriate to match them, even though they have a large similarity score. This regularization term can be integrated into the problem formulation in unified regularized optimization framework, shown, for example below:

$$\max_{x}(A \circ W^a)^\top x + x^\top(D \circ W^d)x + T \circ W^t \otimes_1 x \otimes_2 x \otimes_3 x - \lambda_1 \|(V+U) \circ X\|^2$$

$$\text{s.t. } X 1_{n' \times 1} \leq 1_{n \times 1}, X^\top 1_{n \times 1} \leq 1_{n' \times 1}$$

In the equation above, $\lambda_1$ is a hyperparameter and is introduced to balance the maximization of the overall similarity and the minimization of the overall uncertainty. V corresponds to the attribute uncertainty matrix and U corresponds to the position uncertainty matrix (described generally above). The regularization term (which follows the hyperparameter $\lambda_1$) denotes the overall attribute and position uncertainty given X.

Non-covisible elements may increase the number of incorrect correspondences, because an element present in one hyper-graph may not be present by others (i.e. can be in one of hyper-graph 400 or hyper-graph 500, but not the other) due to limited field of view, occlusion, or communication drop-outs. Thus, correspondences may not exist (see noncorresponding nodes 605 in FIG. 6 as an example). In order to explicitly address this issue, a regularization term $\|X\|^2$ can be introduced to reduce the number of correspondences:

$$\max_{x}(A \circ W^a)^\top x + x^\top(D \circ W^d)x + T \circ W^t \otimes_1 x \otimes_2 x \otimes_3 x - \lambda_1 \|X\|^2$$

$$\text{s.t. } X 1_{n' \times 1} \leq 1_{n \times 1}, X^\top 1_{n \times 1} \leq 1_{n' \times 1}$$

In the above equation, $\lambda_2$ is the hyper-parameter to balance the overall similarity and the regularization term. When the number of identified object correspondences increases, both the value of the regularization term the overall similarity increase. One correspondence is added to X only if the increase of the overall similarity caused by the newly added correspondence is larger than the penalty resulted from the regularization. Accordingly, correspondences among non-covisible objects often having smaller similarities are less likely to be added to X, and co-visible objects that have larger similarities are more likely to be added to X and identified.

In summary, after integrating both regularization terms into the unified mathematical framework of regularized constrained optimization, a final graph matching formulation to address correspondence identification with non-covisible objects under uncertainty can become:

$$\max_x (A \circ W^a)^\top x + x^\top (D \circ W^d) x +$$
$$T \circ W^t \otimes_1 x \otimes_2 x \otimes_3 x - \lambda_1 \|(V + U) \circ X\|^2 - \lambda_2 \|X\|^2$$
$$\text{s.t. } X 1_{n' \times 1} \le 1_{n \times 1}, X^\top 1_{n \times 1} \le 1_{n' \times 1}$$

For solving the corresponding optimization problem above, heuristic optimization methods for graph matching can be used, such as Markov chain Monte Carlo (MCMC) sampling optimization.

Figure 7:
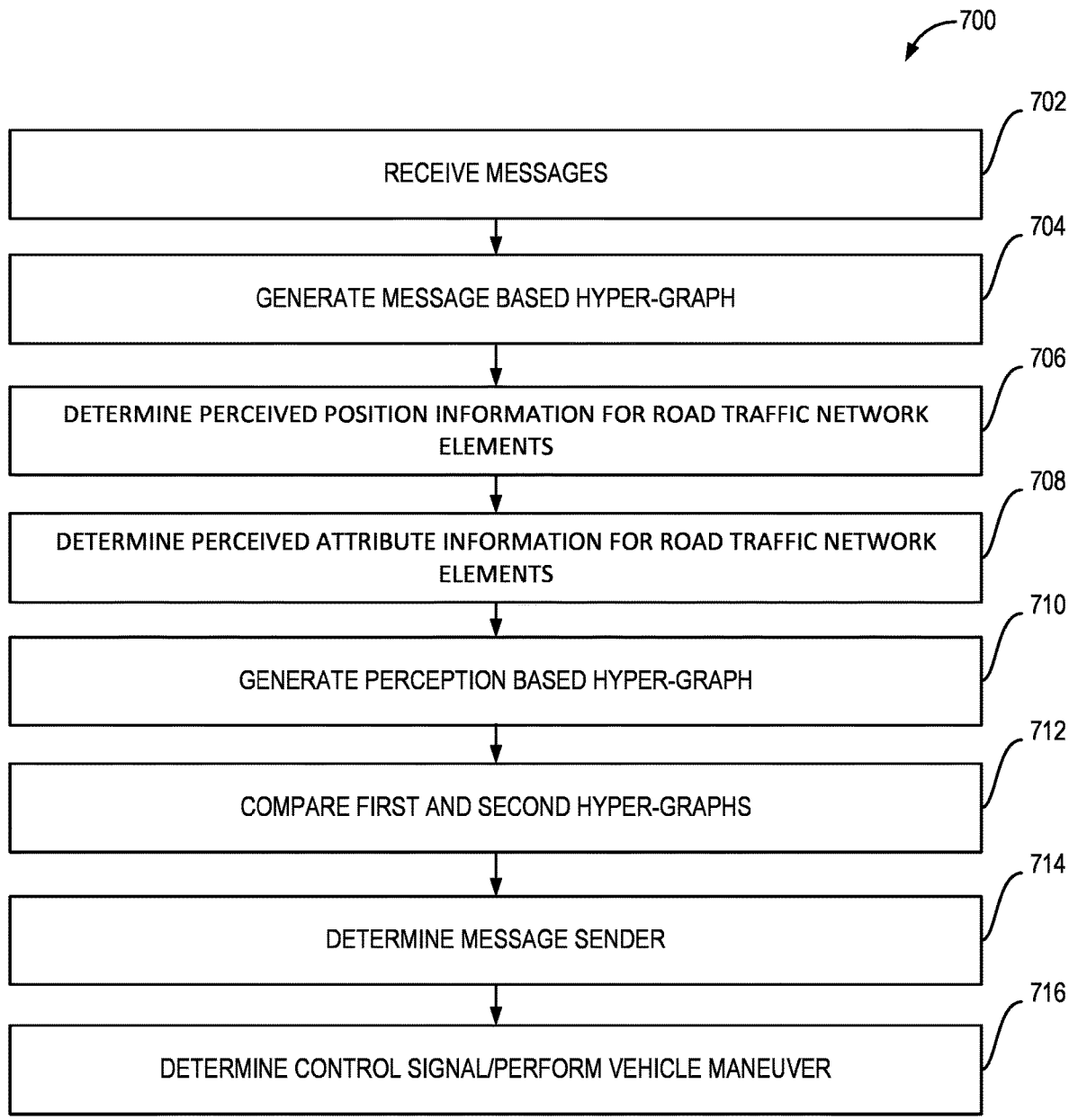
FIG. 7 shows a method for message sender identification via hyper-graph matching, which can be performed, for example, at an ego-vehicle, according to various embodiments described herein.

FIG. 7 shows method 700 that can be performed for hyper-graph generation and matching, and/or message sender identification as described herein. The method 700 can be performed at an ego-vehicle 304 navigating a road traffic network 300, as shown, for example in FIG. 4. The method 700 can be performed at hyper-graph generation and matching system 200 (e.g. a decision and control circuit 203) as shown in FIG. 2. It can also be appreciated that various user devices can be part of the road traffic network 300. As such, it can be appreciated that method 700 (or aspects thereof) can be performed at various user devices. Method 700 can enable cooperative vehicle driving. Method 700 can be robust to account for various uncertainties, as well as allow for maintaining vehicle, pedestrian (and other elements' of road traffic network) privacy.

The steps shown are merely non-limiting examples of steps that can be included for performing the method of hyper-graph generation and matching, and/or message sender identification as described herein. The steps shown in the method 700 can include and/or be included in (e.g. executed as part of) one or more circuits or logic described herein. It can be understood that the steps shown can be performed out of order (i.e. a different order than that shown in FIG. 7), and with or without one or more of the steps shown. These steps can also repeat, for example for performing of steps according to updated information. The steps can also be performed according to data of various time points in a time series.

Referring again to FIG. 7, FIG. 7 shows method 700 for message sender identification via hyper-graph matching. Method 700 can include step 702 for receiving from one or more connected elements of a road traffic network, one or more messages. The messages can be message 310 described with reference to FIG. 3 and road traffic network 300. The messages can be a BSM.

Method 700 can include a step 704 for generating, a first (message-based) hyper-graph based on the one or more received messages. The first (message-based) hyper-graph can be message based hyper-graph 400, or hyper-graph $\mathcal{G}$ described with reference to FIG. 4.

Method 700 can include a step 706 for determining perceived position information for one or more elements of the road traffic network. Method 700 can include a step 708 for determining perceived position information for one or more elements of the road traffic network. The perceived position information and/or perceived attribute information can be included or be based on the model for the road traffic network as generated or determined herein.

Method 700 can include a step 710 for generating, a second (perception based) hyper-graph based on the perceived position and/or attribute information of one or more elements of the road traffic network. The second (perception based) hyper-graph can be hyper-graph 500 or hyper-graph $\mathcal{G}'$ described with reference to FIG. 5.

Method 700 can include a step 712 for comparing, the first (message-based) hyper-graph to the second (perception-based) hyper-graph. The comparison can be completed as shown with comparison 600 and the related description of FIG. 6. The comparison can include generation of attribute similarity matrix A, distance similarity matrix D, angular similarity tensor T, and correspondence matrix X. The comparison can include determining the relative importance of the attributes, the distance, or the angular similarity, by creating, for example weight matrices $W^a$, $W^d$, $W^t$. The comparison can include solving one or more graph matching problem that integrates at least one of i) the similarities of the attributes of the elements, or ii) the spatial relationships of the elements, into a unified optimization framework as described with reference to FIG. 6.

Method 700 can include a step 714 for determining the sender(s) of one or more of the received messages (i.e. at step 702), based on the comparison (i.e. based on step 712). The determination can be based on the related discussion of FIG. 6.

The method 700 can also include a related step 716 for generating one or more vehicle control signals (such as a vehicle control input, e.g. for vehicle system 258 shown in FIG. 2) which can relevant to performing one or more vehicle maneuvers (including coordinated vehicle maneuvers) based on the determined sender (i.e. at step 714). It can be understood that one or more weights as discussed herein can be updated based on a result or outcome of the vehicle maneuver.

Figure 8:
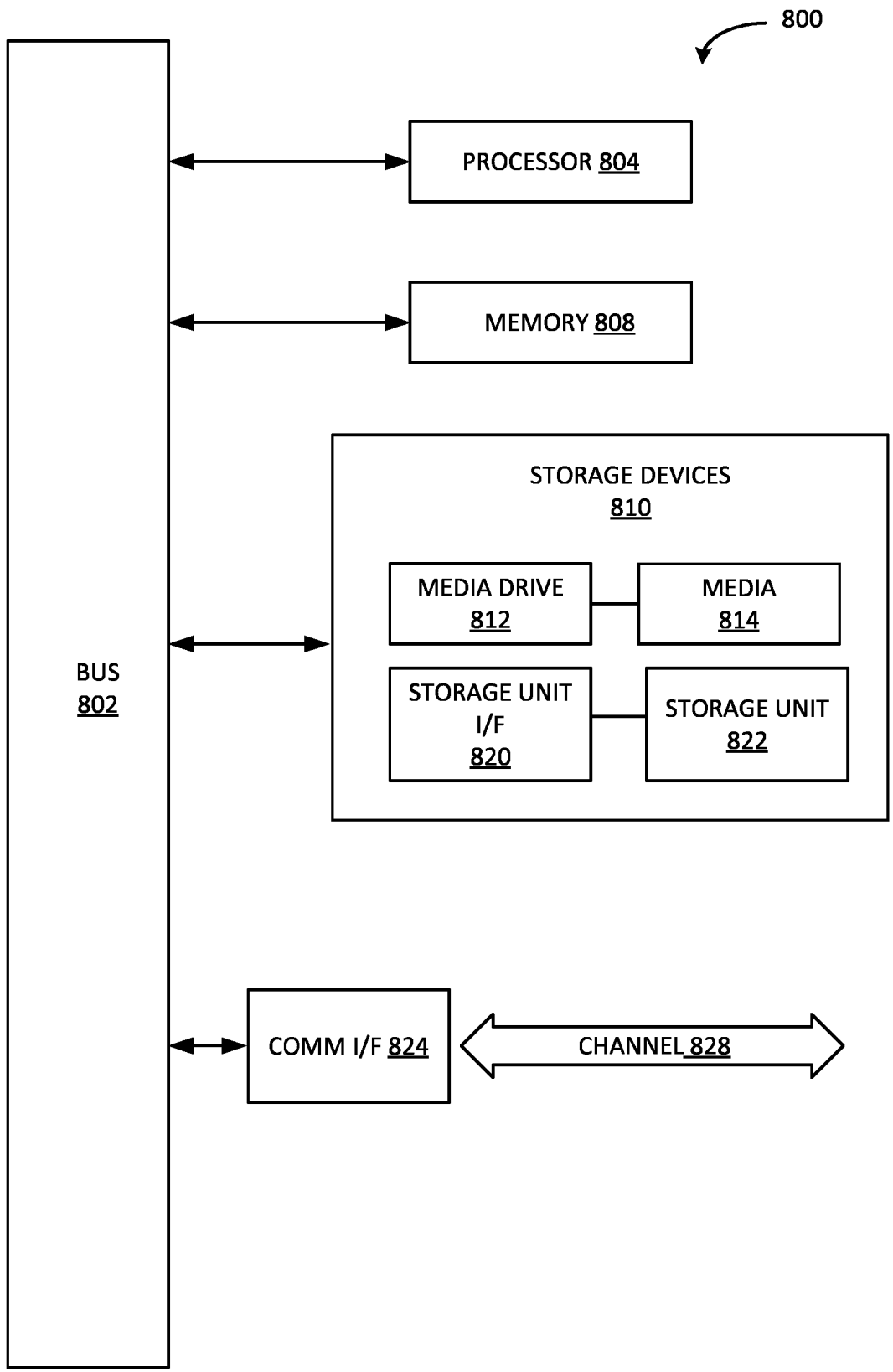
FIG. 8 shows an example computing component within which aspects of the present technology may be implements.

As used herein, the terms circuit, system, and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a vehicle, a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability. For example, a computing component might be found in components making up vehicle 100, message sender identification circuit 210, decision and control circuit 203, computing system 110, ECU 125.

Computing component 800 might include, for example, one or more processors, controllers, control components, or other processing devices. Processor 804 might be implemented using a general-purpose or special-purpose processing engine such as, for example, a microprocessor, controller, or other control logic. The processor might be specifically configured to execute one or more instructions for execution of logic of one or more circuits described herein, such as message sender identification circuit 210, decision and control circuit 203, and/or logic for control systems 130. Processor 804 may be configured to execute one or more instructions for performing one or more methods, such as method 700 described in FIG. 7.

Processor 804 may be connected to a bus 802. However, any communication medium can be used to facilitate interaction with other components of computing component 800 or to communicate externally. In embodiments, processor 804 may fetch, decode, and/or execute one or more instructions to control processes and/or operations for enabling vehicle servicing as described herein. For example, instructions can correspond to steps for performing one or more steps of method 700 shown in FIG. 7.

Computing component 800 might also include one or more memory components, simply referred to herein as main memory 808. For example, random access memory (RAM) or other dynamic memory, might be used for storing information and instructions to be fetched, decoded, and/or executed by processor 804. Such instructions may include one or more instructions for execution of methods 700 and/or for execution of one or more logical circuits described herein. Instructions can include instructions 209, and/or 108 as described herein, for example. Main memory 808 might also be used for storing temporary variables or other intermediate information during execution of instructions to be fetched, decoded, and/or executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communication port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

As described herein, vehicles can be flying, partially submersible, submersible, boats, roadway, off-road, passenger, truck, trolley, train, drones, motorcycle, bicycle, or other vehicles. As used herein, vehicles can be any form of powered or unpowered transport. Obstacles can include one or more pedestrian, vehicle, animal, and/or other stationary or moving objects. Although roads are references herein, it is understood that the present disclosure is not limited to roads or to 1d or 2d traffic patterns.

The term "operably connected," "coupled", or "coupled to", as used throughout this description, can include direct or indirect connections, including connections without direct physical contact, electrical connections, optical connections, and so on.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, or C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof. While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order, and/or with each of the steps shown, unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer implemented method for message sender identification of a connected element of a road traffic network, the method comprising:
receiving, at a processing component of a vehicle, from one or more connected elements of the road traffic network, one or more messages, the one or more messages comprising position information for the one or more connected elements;
generating, by the processing component, a message-based hyper-graph based on the one or more received messages;
determining, by a sensor of the vehicle, perceived position information for one or more elements of the road traffic network;
generating, by the processing component, a perception-based hyper-graph based on the perceived position information;
comparing, the message-based hyper-graph to the perception-based hyper-graph; and
determining the sender of one of the received messages based on the comparison.

2. The computer implemented method of claim 1, further comprising: determining, by the sensor of the vehicle, perceived attribute information, wherein:
the one or more messages comprise attribute information for the one or more connected elements;
the message-based hyper-graph is further based on the attribute information in the one or more messages; and
the perception-based hyper-graph is based on the perceived position information and the perceived attribute information.

3. The computer implemented method of claim 2, wherein the attribute information comprises at least one of an element color, element velocity, element acceleration, or an element size.

4. The computer implemented method of claim 2, wherein the message-based hyper-graph comprises:
a plurality of nodes comprising: an ego-vehicle node corresponding to the ego-vehicle and; a node corresponding to the sender of the message, wherein each node in the plurality of nodes comprises corresponding attributes;
edges between the nodes corresponding to the distances between the respective elements of corresponding nodes; and
the sender of one of the received messages is determined based on linking a node of the message-based hyper-graph corresponding to the received message for which the sender is determined, to a similar node of the perception-based hyper-graph.

5. The computer implemented method of claim 2, wherein the message-based hyper-graph comprises:
a plurality of nodes comprising: an ego-vehicle node corresponding to the ego-vehicle and; a sender node corresponding to the sender of the message, wherein each node in the plurality of nodes comprises corresponding attributes;
edges between the nodes corresponding to the distances between the respective elements of corresponding nodes; and
the sender of one of the received messages is determined based on a similarity of the attributes of the message-based hyper-graph compared to the attributes of the perception-based hyper-graph.

6. The computer implemented method of claim 5, wherein the similarity of the attributes are weighted based on a classification of the attributes.

7. The computer implemented method of claim 6, wherein the weights for the similarity of the attributes are updated based on an outcome of the determination of the sender of the one of the received messages.

8. The computer implemented method of claim 5, wherein the sender of one of the received messages is determined based on the similarity of the attributes of the message-based hyper-graph compared to attributes of the perception-based hyper-graph, and based on the similarity of the positions of the nodes of the message-based hyper-graph compared to positions of the nodes of the perception-based hyper-graph.

9. The computer implemented method of claim 8, wherein the similarity of the attributes are weighted based on a classification of the attributes and an uncertainty in the positions for the nodes in the perception-based hyper-graph.

10. The computer implemented method of claim 5, wherein the sender of one of the received messages is determined based on the similarity of the attributes of the message-based hyper-graph compared to attributes of the perception-based hyper-graph, and based on the angular similarity between two triangles between nodes in each hyper-graph, wherein each triangle is constructed by three nodes in each hyper-graph.

11. The computer implemented method of claim 1, wherein the message-based hyper-graph comprises a plurality of nodes including a node corresponding to the ego-vehicle and a node corresponding to the sender of the message, and edges between the nodes corresponding to the distances between the nodes; and wherein the sender of one of the received messages is determined based on linking a node of the message-based hyper-graph corresponding to the received message for which the sender is determined, to a positionally similar node of the perception-based hyper-graph.

12. A network connected vehicle, comprising:
a communication circuit configured to receive, from one or more connected elements of a road traffic network, one or more messages, the one or more messages comprising position information for the one or more connected elements;
a perception system comprising a sensor, the perception system configured to determine position information for one or more elements of the road traffic network based on a value of a signal generated by the sensor;
a processing component configured to:
generate a message-based hyper-graph based on the one or more received messages;
generate a perception-based hyper-graph based on the perceived position information;
compare the message-based hyper-graph to the perception-based hyper-graph; and
determine the sender of one of the received messages based on the comparison; and
generate a control input actuation signal based on the determination.

13. The network connected vehicle of claim 12, wherein:
the perception system is configured to generate perceived attribute information for the one or more elements of the road traffic network based on the value for the signal generated by the sensor or a value for a signal generated by another sensor;
the communication circuit is further configured to receive attribute information for the one or more connected elements, wherein the attribute information is communicated in the one or more messages;
the message-based hyper-graph is further based on the attribute information in the one or more messages; and
the perception-based hyper-graph is based on the perceived position information and the perceived attribute information.

14. The network connected vehicle of claim 13, wherein the attribute information includes at least one of an element color, element velocity, element acceleration, or an element size.

15. The network connected vehicle of claim 13, wherein the message-based hyper-graph comprises:
a plurality of nodes comprising: an ego-vehicle node corresponding to the ego-vehicle and; a sender node corresponding to the sender of the message, wherein each node in the plurality of nodes comprises corresponding attributes;
edges between the nodes corresponding to the distances between the respective elements of corresponding nodes; and
the sender of one of the received messages is determined by solving a hyper-graph matching problem that integrates at least one of i) the similarities of the attributes of the elements of the road traffic network, or ii) the spatial relationships between the elements of the message-based hyper-graph and the perception-based hyper-graph.

16. The network connected vehicle of claim 15, wherein the sender of one of the received messages is determined based on the similarity of the attributes of the message-based hyper-graph compared to attributes of the nodes of the perception-based hyper-graph, and based on the angular similarity between two triangles between nodes in each hyper-graph, wherein each triangle is constructed by three nodes in each hyper-graph.

17. The network connected vehicle of claim 13, wherein the message-based hyper-graph comprises:
 a plurality of nodes comprising: an ego-vehicle node corresponding to the ego-vehicle and; a node corresponding to the sender of the message, wherein each node in the plurality of nodes comprises corresponding attributes;
 edges between the nodes corresponding to the distances between the respective elements of corresponding nodes; and
 the sender of one of the received messages is determined based on a similarity of the attributes of the message-based hyper-graph compared to the attributes of the perception-based hyper-graph.

18. The network connected vehicle of 17, wherein the similarity of the attributes are weighted based on a classification for the attributes and an uncertainty in the positions for the nodes in the perception-based hyper-graph.

19. A computer implemented method for message sender identification of a connected element of a road traffic network, the method comprising:
 receiving, at a processing component of a vehicle, from one or more connected elements of the road traffic network, one or more messages, the one or more messages comprising position information for the one or more connected elements;
 generating, by a processing component of a connected vehicle, a message-based hyper-graph based on the positions of connected elements of the road traffic network as communicated to the vehicle by the connected elements, wherein the connected elements correspond to nodes of the message-based hyper-graph;
 generating, by the processing component, a perception based hyper-graph based on the perceived positions of at least a subset of the elements of the road traffic network as determined by a sensor of the vehicle, wherein the at least a subset of the elements of the road traffic network correspond to nodes of the perception-based hyper-graph; and
 matching a node of the message-based hyper-graph to a corresponding node of the perception-based hyper-graph.

20. The computer implemented method of claim 19, wherein the message-based hyper-graph is further generated based on a value of communicated attribute information consisting of at least one of a speed, brake-pedal status, or dimension of the connected elements as communicated to the vehicle by the connected elements; and
 the perception-based hyper-graph is further generated based on at least one of a perceived attribute information comprising at least one of a speed, brake-pedal status, or dimension for the at least a subset of the elements of the road traffic network, and wherein the matched node of the perception-based hyper-graph corresponds to a node having a similar position and value of perceived attribute information compared to the position and value for the communicated attribute information of the matched node of the message-based hyper-graph.

* * * * *